US012739771B2

(12) United States Patent
Sugawara

(10) Patent No.: US 12,739,771 B2
(45) Date of Patent: Sep. 15, 2026

(54) USER EQUIPMENT (UE)

(71) Applicant: SHARP KABUSHIKI KAISHA, Sakai City (JP)

(72) Inventor: Yasuo Sugawara, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 335 days.

(21) Appl. No.: 18/294,694

(22) PCT Filed: Jun. 23, 2022

(86) PCT No.: PCT/JP2022/025065
§ 371 (c)(1),
(2) Date: Feb. 2, 2024

(87) PCT Pub. No.: WO2023/013278
PCT Pub. Date: Feb. 9, 2023

(65) Prior Publication Data
US 2025/0056461 A1 Feb. 13, 2025

(30) Foreign Application Priority Data
Aug. 5, 2021 (JP) ................................ 2021-128875

(51) Int. Cl.
*H04W 60/00* (2009.01)
*H04W 48/08* (2009.01)

(52) U.S. Cl.
CPC .......... *H04W 60/00* (2013.01); *H04W 48/08* (2013.01)

(58) Field of Classification Search
CPC ..... H04W 60/00; H04W 48/08; H04W 8/183; H04W 60/04; H04W 60/06
USPC ....................................................... 455/435.1
See application file for complete search history.

(56) References Cited

U.S. PATENT DOCUMENTS

2021/0258857 A1* 8/2021 Won ..................... H04W 48/02

OTHER PUBLICATIONS

Ericsson et al., "Onboarding in SNPN—initial registration", CP-211316, 3GPP TSG-CT Meeting #92e, E-Meeting, Jun. 14-16, 2021.
Vivo, "update of the counter for Snpn", C1-202193, 3GPP TSG-CT WG1 Meeting #123-e, Electronic meeting, Apr. 16-24, 2020.
3GPP TS 23.501 V17.1.1 (Jun. 2021) 3rd Generation Partnership Project; Technical Specification Group Services and System Aspects; System architecture for the 5G System (5GS); Stage 2 (Release 17).
3GPP TS 23.502 V17.1.0 (Jun. 2021) 3rd Generation Partnership Project; Technical Specification Group Services and System Aspects; Procedures for the 5G System (5GS); Stage 2 (Release 17).

(Continued)

*Primary Examiner* — Tanmay K Shah
(74) *Attorney, Agent, or Firm* — ScienBiziP, P.C.

(57) ABSTRACT

By introducing a concept such as an equivalent SNPN, mobility can be improved, service continuity can be improved, NSSAI can be appropriately managed, and an equivalent SNPN list can be appropriately managed. In a registration procedure, a UE transmits a registration request message to start a timer T3510, and in a case that the UE receives a registration reject message without integrity protection including a 5GMM cause value indicating an illegal UE, the UE stops the timer T3510 in operation and deletes an equivalent SNPN list stored in the UE.

6 Claims, 5 Drawing Sheets

(56) References Cited

OTHER PUBLICATIONS

3GPP TS 24.501 V17.3.1 (Jun. 2021) 3rd Generation Partnership Project; Technical Specification Group Core Network and Terminals; Non-Access-Stratum (NAS) protocol for 5G System (5GS); Stage 3; (Release 17).

3GPP TR 23.700-07 V17.0.0 (Mar. 2021) 3rd Generation Partnership Project; Technical Specification Group Services and System Aspects; Study on enhanced support of Non-Public Networks (NPN) (Release 17).

* cited by examiner

USER EQUIPMENT (UE)

TECHNICAL FIELD

The present invention relates to a User Equipment (UE).

BACKGROUND ART

In the 3rd Generation Partnership Project (3GPP), system architecture of a 5G System (5GS), which is a fifth generation (5G) mobile communication system, has been studied, and discussions are underway to support new procedures and new functions (see NPLs 1 to 3). In the Release 16 standard, a concept of Non-Public Network (NPN) is introduced, and in the Release 17, its function extension is being discussed (see NPL 4).

CITATION LIST

Non Patent Literature

NPL 1: 3GPP TS 23.501 V17.1.1 (2021-06); 3rd Generation Partnership Project; Technical Specification Group Services and System Aspects; System Architecture for the 5G System (5GS); Stage 2 (Release 17)

NPL 2: 3GPP TS 23.502 V17.1.0 (2021-06); 3rd Generation Partnership Project; Technical Specification Group Services and System Aspects; Procedures for the 5G System (5GS); Stage 2 (Release 17)

NPL 3: 3GPP TS 24.501 V17.3.1 (2021-06); 3rd Generation Partnership Project; Technical Specification Group Core Network and Terminals; Non-Access-Stratum (NAS) protocol for 5G System (5GS); Stage 3 (Release 17)

NPL 4: 3GPP TR 23.700-07 V17.0.0 (2021-03); 3rd Generation Partnership Project; Technical Specification Group Services and System Aspects; Study on enhanced support of Non-Public Networks (NPN) (Release 17)

SUMMARY OF INVENTION

Technical Problem

In NPL 4, an equivalent SNPN has been planned to be studied on a Stand-alone NPN (SNPN) which is one form of NPN, but no discussion is made and no disclosure is made.

An embodiment of the present invention has been made in view of the above-described circumstances and aims to improve mobility related to SNPN by newly introducing a concept such as the equivalent SNPN.

Solution to Problem

The UE according to an embodiment of the present invention is a User Equipment (UE) including a transmission and/or reception unit, a storage unit, and a controller, in which in a registration procedure, the transmission and/or reception unit transmits a registration request message, the controller starts a timer T3510 based on transmission of the registration request message, and in a case that the transmission and/or reception unit receives a registration reject message without integrity protection including a 5GMM cause value indicating an illegal UE, the controller stops the timer T3510 in operation and deletes an equivalent SNPN list stored in the storage unit.

Advantageous Effects of Invention

According to an embodiment of the present invention, by introducing a concept such as an equivalent SNPN, improvement of mobility and improvement of service continuity can be provided. According to the present invention, NSSAI can be appropriately managed by introducing the concept such as an equivalent SNPN. According to the present invention, an equivalent SNPN list can be appropriately managed.

DESCRIPTION OF EMBODIMENTS

A best mode for carrying out an embodiment of the present invention will be described below with reference to the drawings. Note that, as an example, an embodiment of a mobile communication system to which the present invention is applied will be described in the present embodiment.

1. Overview of System

Figure 1:
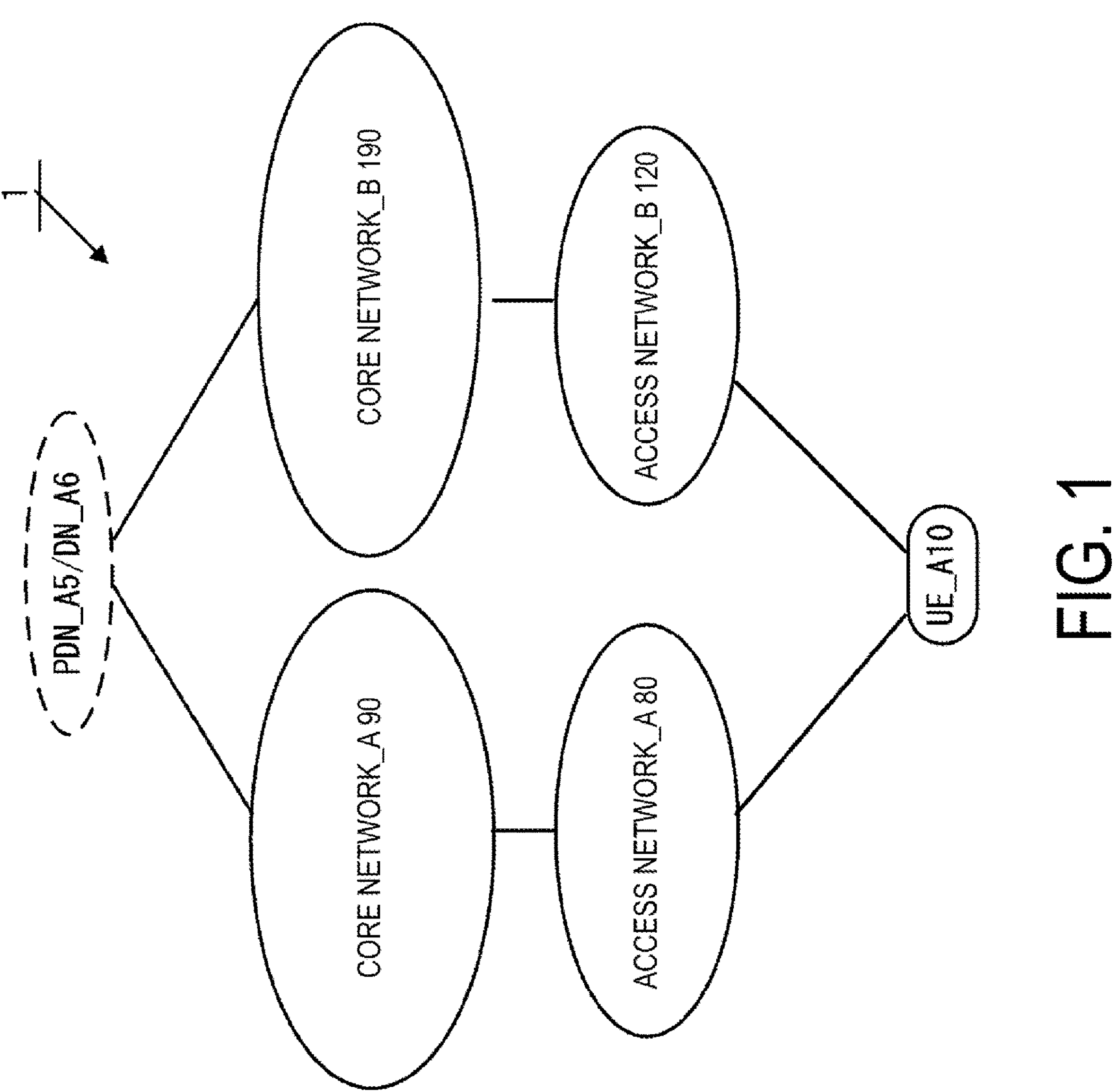
FIG. 1 is a diagram illustrating an overview of a mobile communication system 1.
Figure 2:
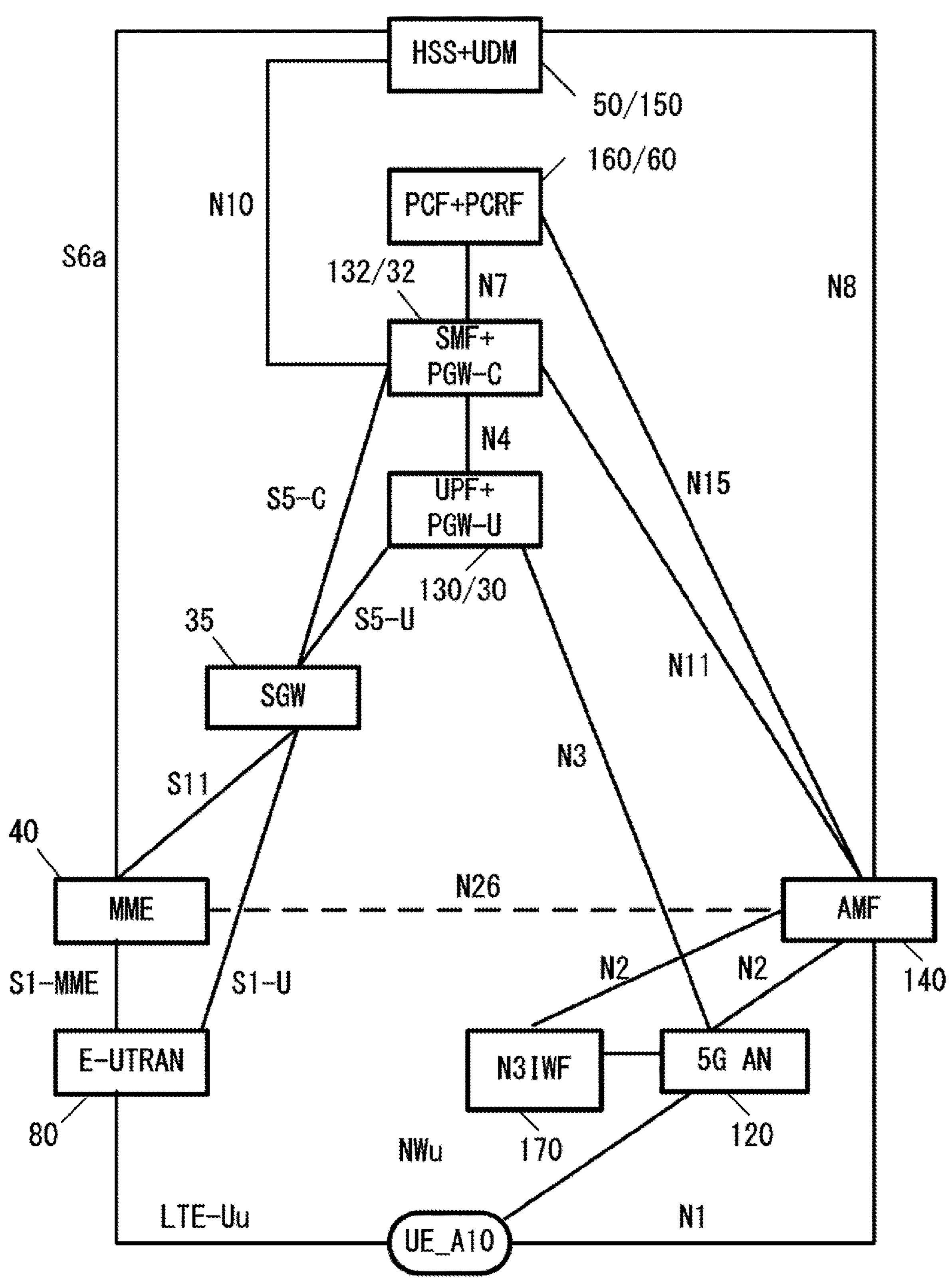
FIG. 2 is a diagram illustrating a detailed configuration of the mobile communication system 1.
Figure 3:
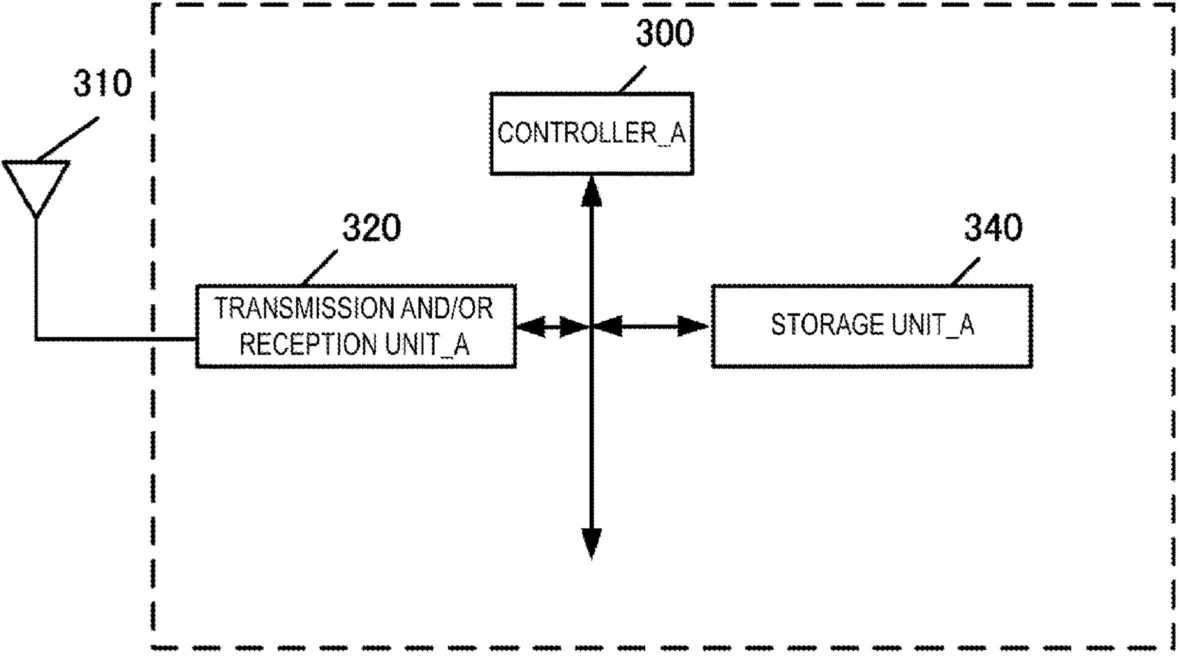
FIG. 3 is a diagram illustrating an apparatus configuration of a UE.
Figure 4:
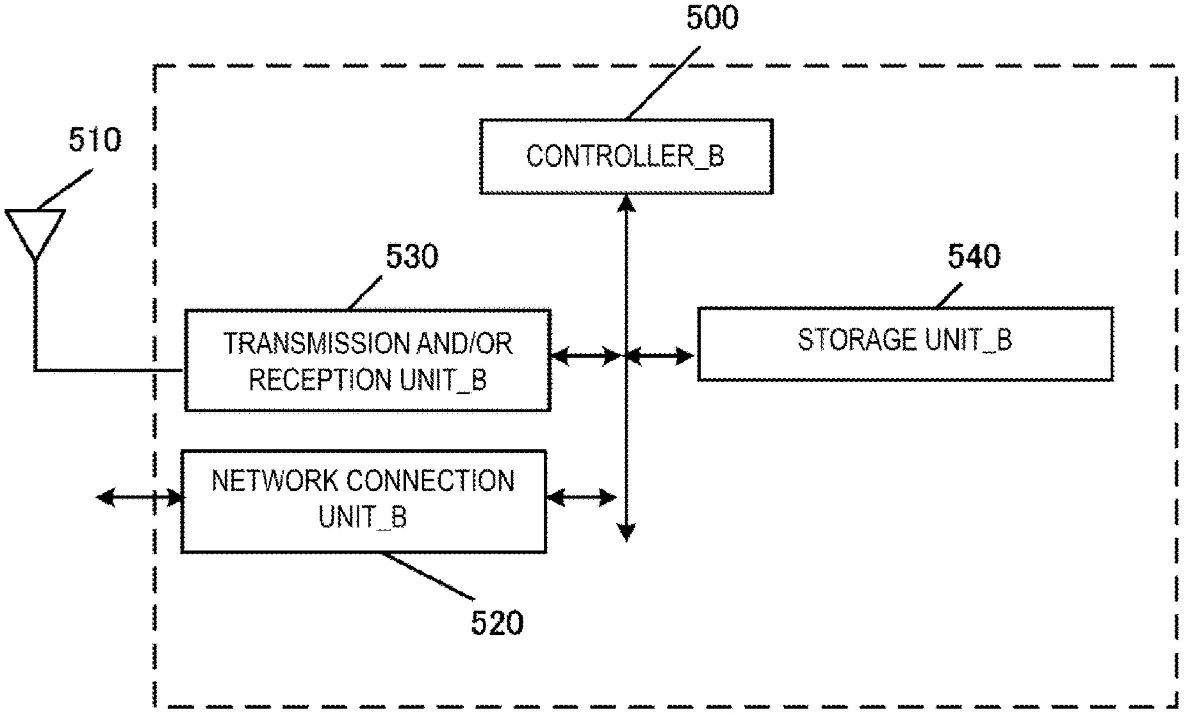
FIG. 4 is a diagram illustrating a configuration of an access network apparatus (gNB) in the 5GS.
Figure 5:
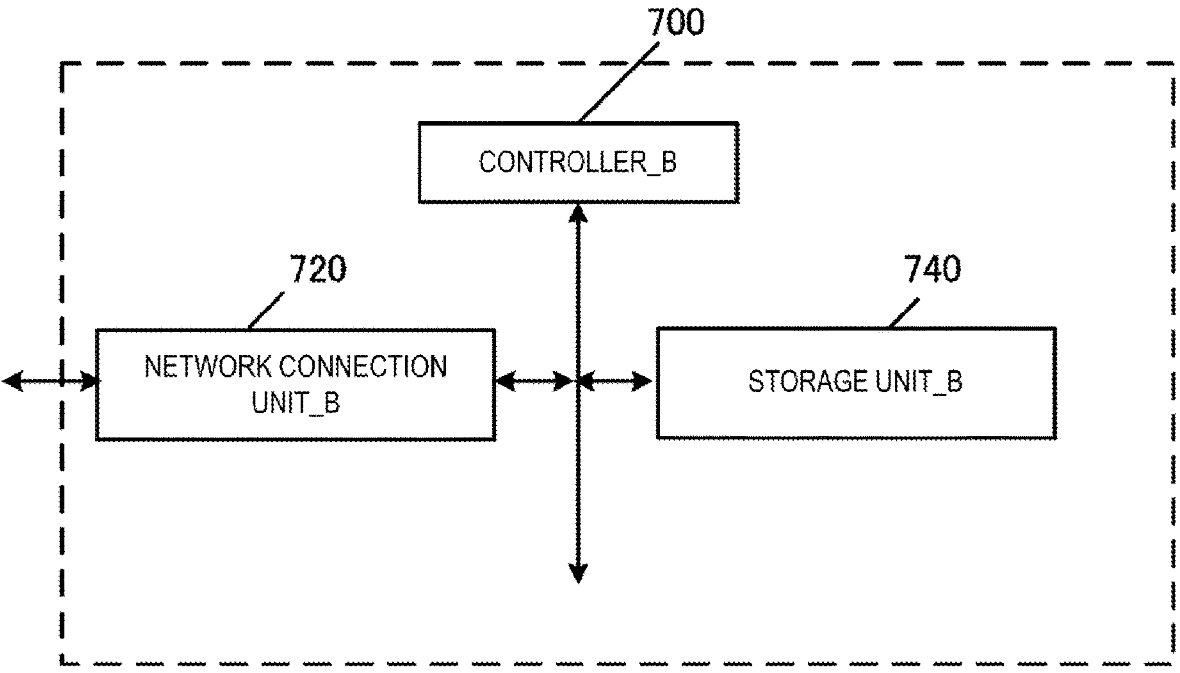
FIG. 5 is a diagram illustrating a configuration of a core network apparatus (AMF/SMF/UPF/NSACF) in the 5GS.

First, FIG. 1 is a diagram for illustrating an overview of a mobile communication system 1 used in each embodiment, and FIG. 2 is a diagram for illustrating a detailed configuration of the mobile communication system 1.

FIG. 1 illustrates the mobile communication system 1 including a UE_A 10, an access network_A 80, a core network_A 90, a Packet Data Network (PDN)_A 5, an access network_B 120, a core network_B 190, and a Data Network (DN)_A 6.

In the following description, the symbols may be omitted, as a UE, an access network_A, a core network_A, a PDN, an access network_B, a core network_B, and a DN, in regard to these apparatuses and functions.

FIG. 2 illustrates apparatuses and functions such as a UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the symbols may be omitted, as a UE, an E-UTRAN, an MME, an SGW, a PGW-U, a PGW-C, a PCRF, an HSS, a 5G AN, an AMF, a UPF, an SMF, a PCF, a UDM, and an N3IWF, in regard to these apparatuses and functions.

Note that an Evolved Packet System (EPS) that is a 4G system includes the access network_A and the core network_A and may further include the UE and/or the PDN. A 5G System (5GS) that is a 5G system includes the UE, the access network_B, and the core network_B and may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus that can perform radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as a user equipment or a terminal apparatus.

The access network_A corresponds to an Evolved Universal Terrestrial Radio Access Network (E-UTRAN) and/or a wireless LAN access network. In the E-UTRAN, one or more evolved Node Bs (eNBs) 45 are deployed. Note that in the following description, the symbol for the eNB 45 may be omitted as an eNB. In a case that there are multiple eNBs, the eNBs are connected to each other via, for example, an X2 interface. In the wireless LAN access network, one or more access points are deployed.

The access network_B corresponds to a 5G access network (5G AN). The 5G AN includes an NG Radio Access Network (NG-RAN) and/or a non-3GPP access network. In the NG-RAN, one or more NR NodeBs (gNBs) 122 are deployed. Note that in the following description, the symbol for the gNB 122 may be omitted as a gNB. The gNB is a node that provides a New Radio (NR) user plane and control plane to the UE and is connected to a 5GCN via the NG interface (including the N2 interface or the N3 interface). In other words, the gNB is a base station apparatus newly designed for the 5GS and has functions different from those of the base station apparatus (eNB) used in the EPS that is a 4G system. In a case that there are multiple gNBs, the gNBs are connected to each other via, for example, an Xn interface.

The non-3GPP access network may be an untrusted non-3GPP access network or may be a trusted non-3GPP access network. Here, the untrusted non-3GPP access network may be a non-3GPP access network, such as a public wireless LAN, without security management performed in the access network, for example. On the other hand, the trusted non-3GPP access network may be an access network defined by 3GPP and may include a trusted non-3GPP access point (TNAP) and a trusted non-3GPP Gateway function (TNGF).

In the following description, the E-UTRAN and the NG-RAN may be referred to as 3GPP access. The wireless LAN access network and the non-3GPP AN may be referred to as non-3GPP access. The nodes deployed in the access network_B may also be collectively referred to as NG-RAN nodes.

In the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

The core network_B corresponds to a 5G Core Network (5GCN). In the 5GCN, an Access and Mobility Management Function (AMF), a User Plane Function (UPF), a Session Management Function (SMF), a Policy Control Function (PCF), a Unified Data Management (UDM), and the like are deployed. Here, the 5GCN may be referred to as a 5GC.

In the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a Mobile Network Operator (MNO) connecting the access network (the access network_A and/or the access network_B) and the PDN and/or the DN, a core network for a mobile network operator that operates and manages the mobile communication system 1, or a core network for a virtual mobile network operator and a virtual mobile communication service provider such as a Mobile Virtual Network Operator (MVNO) and a Mobile Virtual Network Enabler (MVNE).

FIG. 1 illustrates a case that the PDN and the DN are the same; however, the PDN and the DN may be different. The PDN may be a Data Network (DN) that provides communication services for the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In the following, at least some of the access network A, the core network_A, the PDN, the access network_B, the core network_B, and the DN, and/or one or more apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or more apparatuses included in these transmit and/or receive a message and/or perform a procedure".

The UE can be connected to the access network. The UE can be connected to the core network over the access network. In addition, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using the IP, and data is transmitted and/or received using IP packets. Each IP packet includes an IP header and a payload part. In the payload part, data transmitted and/or received by the apparatuses and functions included in the EPS and the apparatuses and functions included in the 5GS may be included. Non-IP communication refers to data communication not using the IP, where data is transmitted and/or received in a form different from the structure of the IP packets For example, non-IP communication may be data communication implemented through transmission and/or reception of application data to which an IP header is not added and may transmit and/or receive user data transmitted and/or received by the UE with another header such as a MAC header and an Ethernet (trade name) frame header added.

Apparatuses which are not illustrated in FIG. 2 may be included in the access network_A, the core network_A, the access network_B, the core network_B, the PDN_A, and the DN_A. For example, the core network_A and/or the core network_B may include an Authentication Server Function (AUSF) and an Authentication, authorization, and accounting (AAA) server (AAA-S).

Here, an AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

The AAA server is an apparatus that is connected directly to the AUSF or indirectly to the AUSF via another network apparatus and has authentication, authorization, and billing functions. The AAA server may be a network apparatus within the core network. Note that the AAA server may not be included in the core network_A and/or the core network_B and may be included in the PLMN. In other words, the AAA server may be a core network apparatus or may be an apparatus outside the core network. For example, the AAA server may be a server apparatus within the PLMN managed by a 3rd party.

Note that, although each of the apparatuses and functions is illustrated one by one for simplicity in FIG. 2, multiple similar apparatuses and functions may be included in the mobile communication system 1. Specifically, multiple apparatuses and functions such as the UE_As 10, the E-UTRANs 80, the MMEs 40, the SGWs 35, the PGW-Us 30, the PGW-Cs 32, the PCRFs 60, the HSSs 50, the 5G ANs 120, the AMFs 140, the UPFs 130, the SMFs 132, the PCFs 160, and/or the UDMs 150 may be included in the mobile communication system 1.

The 5G System (5GS) which is a 5G system is configured to include the UE, the access network, and the core network, but may further include the DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication such as a mobile phone or a smartphone and may be a terminal apparatus that can be connected to an Evolved Packet System (EPS) which is a 4G system as well as to the 5GS. The UE may include a Universal Integrated Circuit Card (UICC) and an Embedded UICC (eUICC). Note that the UE may be referred to as a user equipment or a terminal apparatus.

The access network may be referred to as a 5G access network (5G AN). The 5G AN includes an NG Radio Access Network (NG-RAN) and/or a non-3GPP access network (non-3GPP AN).

One or more base station apparatuses are deployed in the NG-RAN. The base station apparatus may be, for example, the gNB (gNodeB). The gNB is a node that provides the UE with a New Radio (NR) user plane and control plane and that connects to a 5GC via an NG interface (including an N2 interface or N3 interface). In other words, the gNB is a base station apparatus newly designed for the 5GS and includes functions different from the functions of a base station apparatus (eNB) used in the EPS. In a case that there are multiple gNBs, the gNBs are connected to each other via, for example, an Xn interface.

The NG-RAN may be referred to as 3GPP access. The non-3GPP AN may be referred to as the non-3GPP access. Nodes deployed in the access network may also be collectively referred to as NG-RAN nodes.

The apparatus included in the access network and/or an apparatus included in the access network may be referred to as the access network apparatus.

In the access network, the base station apparatus or the access point is deployed. The core network corresponds to a 5GC (5G Core Network). In the 5GC, for example, AMF, UPF, SMF, PCF, N3IWF, and the like are deployed. Here, the 5GC may be referred to as the 5GCN.

The core network and/or an apparatus included in the core network may hereinafter be referred to as a core network apparatus.

The core network may refer to an IP mobile communication network operated by a Mobile Network Operator (MNO) connecting the access network and the DN, a core network for the mobile network operator that operates and manages the mobile communication system, or a core network for a virtual mobile communication operator and a virtual mobile communication service provider such as a Mobile Virtual Network Operator (MVNO) and a Mobile Virtual Network Enabler (MVNE).

The DN may be a DN providing a communication service to the UE. The DN may be configured as a packet data service network or configured for each service. Furthermore, the DN may include a connected communication terminal. Thus, connecting with the DN may be connecting with a communication terminal or a server apparatus deployed in the DN. Furthermore, transmission and/or reception of user data to and/or from the DN may be transmission and/or reception of the user data to and/or from a communication terminal or a server apparatus deployed in the DN.

Hereinafter, at least a part of the access network, the core network, and the DN may be referred to as a network or a network apparatus. One or more apparatuses included in at least a part of the access network, the core network, and the DN may be referred to as a network or a network apparatus. That is, the expression that "the network or the network apparatus transmits and/or receives a message and/or performs a procedure" may mean that "at least a part of the access network, the core network, and the DN, or one or more apparatuses included in these transmit and/or receive a message and/or perform a procedure".

The UE can be connected to the access network. The UE can be connected to the core network over the access network. Furthermore, the UE can connect to the DN via the access network and the core network. In other words, the UE can transmit and/or receive (communicate) user data to and/or from the DN. In a case that the UE transmits and/or receives the user data, not only Internet Protocol (IP) communication but also non-IP communication may be used.

Here, IP communication refers to data communication using the IP, and data is transmitted and/or received using IP packets. Each IP packet includes an IP header and a payload part. In the payload part, data transmitted and/or received by the apparatuses and functions included in the EPS and the apparatuses and functions included in the 5GS may be included.

Non-IP communication refers to data communication not using the IP, where data is transmitted and/or received in a form different from the structure of the IP packets. For example, non-IP communication may be data communication implemented through transmission and/or reception of application data to which an IP header is not added and may transmit and/or receive user data transmitted and/or received by the UE with another header such as a MAC header and an Ethernet (trade name) frame header added.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. At least a part (including all) of the functions of each apparatus may be configured as physical hardware, logical hardware, or software.

Note that each of the storage units (storage unit_340, storage unit_540, and storage unit_740) in the corresponding one of the apparatuses and functions appearing below includes, for example, a semiconductor memory, a Solid State Drive (SSD), a Hard Disk Drive (HDD), or the like. Each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and function in which each storage unit is included. Each storage unit can store identification information, control information, flags, parameters, and the like included in a control message transmitted and/or received in various communication procedures to be described below. Each storage unit may store these pieces of information for each UE.

2.1 Apparatus Configuration of UE

First, an apparatus configuration example of the User Equipment (UE) will be described with reference to FIG. 9. The UE includes a controller_300, an antenna_310, a transmission and/or reception unit_320, and a storage unit_340. The controller_300, the transmission and/or reception unit_320, and the storage unit_340 are connected via a bus. The transmission and/or reception unit_320 is connected to the antenna_310.

The controller_300 is a function unit for controlling the operation and function of the entire UE. Note that the controller_300 may process all of the functions not included in other function units (the transmission and/or reception unit_320 and the storage unit_340) in the UE. The controller_300 reads and executes various programs stored in the storage unit_340 as necessary, thereby implementing various types of processing in the UE.

The transmission and/or reception unit_320 is a function unit for wirelessly communicating with a base station apparatus or the like in the access network via the antenna_310. In other words, the UE can transmit and/or receive the user data and/or the control information to and/or from the access network apparatus, the core network apparatus, the PDN, and/or the DN by using the transmission and/or reception unit_320.

The UE can communicate with the base station apparatus (gNB) in the 5G AN by using the transmission and/or reception unit_320. The UE can transmit and/or receive a Non-Access-Stratum (NAS) message to and/or from the AMF over an N1 interface by using the transmission and/or reception unit_320.

The storage unit_340 is a function unit for storing programs, user data, control information, and the like necessary for each operation of the UE. The storage unit_340 may have a function of storing control information transmitted and/or received to and/or from the access network apparatus, the core network apparatus, and the DN.

2.2. Apparatus Configuration of gNB (Base Station Apparatus) and Access Point

Next, an apparatus configuration example of the gNB will be described with reference to FIG. 10. The gNB includes a controller_500, an antenna_510, a network connection unit_520, a transmission and/or reception unit_530, and a storage unit_540. The controller_500, the network connection unit_520, the transmission and/or reception unit_530, and the storage unit_540 are connected via a bus. The transmission and/or reception unit_530 is connected to the antenna_510.

The controller_500 is a function unit for controlling the entire operations and functions of the gNB. Note that the controller_500 may process all of the functions not included in other function units in the base station apparatus (the network connection unit_520, the transmission and/or reception unit_530, and the storage unit_540) The controller_500 reads and executes various programs stored in the storage unit_540 as necessary, thereby implementing various types of processing in the gNB.

The network connection unit_520 is a function unit for the gNB to communicate with the AMF and/or the UPF. In other words, the gNB can transmit and/or receive the user data and/or the control information to and/or from the AMF and/or the UPF by using the network connection unit_520.

The transmission and/or reception unit_530 is a function unit for performing radio communication with the UE via the antenna_510. In other words, the gNB can transmit and/or receive the user data and/or the control information to and/or from the UE by using the transmission and/or reception unit_530.

The gNB in the 5G AN can communicate with the AMF over the N2 interface and can communicate with the UPF over the N3 interface by using the network connection unit_520. The gNB can communicate with the UE by using the transmission and/or reception unit_530.

The storage unit_540 is a function unit for storing programs, user data, control information, and the like necessary for each operation of the gNB. The storage unit_540 may have a function of storing control information transmitted and/or received to and/or from the UE and another access network apparatus (base station apparatus), core network apparatus, and DN.

Note that the access point may also have an apparatus configuration similar to that of the gNB.

2.3. Apparatus Configuration of AMF

Next, an apparatus configuration example of the AMF will be described with reference to FIG. 11. The AMF includes a controller_700, a network connection unit_720, and a storage unit_740. The controller_700, the network connection unit_720, and the storage unit_740 are connected via a bus. The AMF may be a node that handles the control plane (also referred to as a C-plane).

The controller_700 is a function unit for controlling the entire operations and functions of the AMF. Note that the controller_700 may process all of the functions not included in other function units of the AMF (the network connection unit_720 and the storage unit_740). The controller_700 reads and executes various programs stored in the storage unit_740 as necessary, thereby implementing various types of processing in the AMF.

The network connection unit_720 is a function unit for the AMF to be connected to the base station apparatus, the N3IWF, another AMF, the SMF, the PCF, a Network Slice Selection Function (NSSF), the Unified Data Management (UDM), an SCEF, and/or an NSACF. In other words, the AMF can transmit and/or receive the user data and/or the control information to and/or from the base station apparatus, the N3IWF, another AMF, the SMF, the PCF, the NSSF, the UDM, and/or the SCEF by using the network connection unit_720.

The AMF in the 5GCN can communicate, by using the network connection unit_720, with the base station apparatus or the N3IWF over the N2 interface, with another AMF over the N14 interface, with the SMF over the N11 interface, with the PCF over the N15 interface, with the NSSF over the N22 interface, and with the UDM over the N8 interface. The AMF can transmit and/or receive a NAS message to and/or from the UE over the N1 interface by using the network connection unit_720. Note that the N1 interface is a logical interface, and thus communication between the UE and the AMF is actually performed over the 5G AN.

The storage unit_740 is a function unit for storing programs, user data, control information, and the like necessary for each operation of the AMF. The storage unit_740 may have a function of storing control information transmitted and/or received to and/or from the UE, the access network apparatus, and another core network apparatus and DN.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal with the UE via the N3IWF, a function of authenticating the UE connected via the N3IWF, and the like.

In registration management, an RM state for each UE is managed. The RM state may be synchronized between the UE and the AMF. The RM state includes a deregistered state (RM-DEREGISTERED state) and a registered state (RM-REGISTERED state). In the RM-DEREGISTERED state, the UE is not registered in the network, and thus the AMF is in a state of being unable to reach the UE, because a UE context in the AMF does not have valid location information and routing information for the UE. In the RM-REGISTERED state, the UE is registered in the network, and thus the UE can receive a service that requires registration in the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context or may be a state in which each apparatus establishes a PDU session context. Note that in a case that each apparatus is in 5GMM-REGISTERED, the UE may start transmission and/or reception of the user data and the control message or may respond to paging. In addition, note that in a case that each apparatus is in 5GMM-REGISTERED, the UE may perform a registration procedure other than a registration procedure for initial registration, and/or a service request procedure.

In addition, 5GMM-DEREGISTERED may be a state in which each apparatus does not establish the 5GMM context, a state in which the location information of the UE is not known to the network, or a state in which the network is in a state of being unable to reach the UE. Note that in a case that each apparatus is in 5GMM-DEREGISTERED, the UE may initiate the registration procedure, or may establish the 5GMM context by performing the registration procedure.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state but does not have NAS signaling connection established with the AMF via the N1 interface. In the CM-IDLE state, the UE does not have connection of the N2 interface (N2 connection) nor connection of the N3 interface (N3 connection). In contrast, in the CM-CONNECTED state, the UE has NAS signaling connection established with the AMF via the N1 interface. In the CM-CONNECTED state, the UE may have connection of the N2 interface (N2 connection) and/or connection of the N3 interface (N3 connection).

In addition, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). In addition, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode One or more AMFs may be deployed within the core network. The AMF may be a Network Function (NF) that manages one or more Network Slice Instances (NSIs). The AMF may be a common CP function (Common Control Plane Network Function (CPNF) (CCNF)) shared among multiple NSIs.

Note that in a case that the UE is connected to the 5GS via non-3GPP access, the N3IWF is an apparatus and/or a function deployed between the non-3GPP access and the 5GCN. The N3IWF is desirably deployed in the core network.

2.4. Apparatus Configuration of SMF

Next, an apparatus configuration example of the SMF will be described with reference to FIG. 11. The SMF includes the controller_700, the network connection unit_720, and the storage unit_740. The controller_700, the network connection unit_720, and the storage unit_740 are connected via a bus. The SMF may be a node that handles the control plane.

The controller_700 is a function unit for controlling the entire operations and functions of the SMF. Note that the controller_500 may process all of the functions not included in other function units of the SMF (the network connection unit_720 and the storage unit_740). The controller_700 reads and executes various programs stored in the storage unit_740 as necessary, thereby implementing various types of processing in the SMF.

The network connection unit_720 is a function unit for the SMF to be connected to the AMF, the UPF, the PCF, and/or the UDM. In other words, the SMF can transmit and/or receive the user data and/or the control information to and/or from the AMF, the UPF, the PCF, the UDM, and/or the NSACF by using the network connection unit_720.

The SMF in the 5GCN can communicate, by using the network connection unit_720, with the AMF over the N11 interface, with the UPF over the N4 interface, with the PCF via the N7 interface, and with the UDM over the N10 interface.

The storage unit_740 is a function unit for storing programs, user data, control information, and the like necessary for each operation of the SMF. The storage unit_740 may have a function of storing control information transmitted and/or received to and/or from the UE, the access network apparatus, and another core network apparatus and DN.

The SMF has a Session Management function such as establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of issuing a notification about arrival of downlink data (Downlink Data Notification), a function of providing SM information specific to the AN (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 11. The UPF includes the controller_700, the network connection unit_720, and the storage unit_740. The controller 700, the network connection unit_720, and the storage unit_740 are connected via a bus. The UPF may be a node that handles the control plane.

The controller_700 is a function unit for controlling the entire operations and functions of the UPF. Note that the controller_700 may process all of the functions not included in other function units of the AMF (the network connection unit_720 and the storage unit_740). The controller_700 reads and executes various programs stored in the storage unit_740 as necessary, thereby implementing various types of processing in the UPF.

The network connection unit_720 is a function unit for the UPF to be connected to the base station apparatus (gNB) in the 5G AN, and/or the SMF, and/or the DN. In other words, the UPF can transmit and/or receive the user data and/or the control information to and/or from the base station apparatus, the N3IWF, the SMF, the DN, and/or another UPF by using the network connection unit_720.

The UPF in the 5GCN can communicate, by using the network connection unit_720, with the base station apparatus or the N3IWF over the N3 interface, with the SMF over the N4 interface, with the DN over an N6 interface, and with another UPF over an N9 interface.

The storage unit 740 is a function unit for storing programs, user data, control information, and the like necessary for each operation of the UPF. The storage unit_740 may have a function of storing control information transmitted and/or received to and/or from the UE, the access network apparatus, and another core network apparatus and DN.

The UPF has a function as an anchor point for intra-RAT mobility or inter-RAT mobility, a function as an external PDU session point to be mutually connected with the DN (that is, a function of transferring the user data as a gateway between the DN and the core network), a function of routing and transferring packets, an Uplink Classifier (UL CL) function of supporting routing of multiple traffic flows for one DN, a Branching point function of supporting a multi-homed PDU session, a Quality of Service (QOS) processing function for a user plane, a function of verifying uplink traffic, a function of triggering buffering of downlink packets and Downlink Data Notification, and the like.

The UPF may be a gateway for IP communication and/or non-IP communication. The UPF may have a function of transferring IP communication, or a function of conversion between non-IP communication and IP communication. Furthermore, the multiple gateways deployed may be gateways connecting the core network with a single DN. Note that the UPF may have connectivity with another NF and may connect to each apparatus via another NF.

Note that the user plane refers to the user data transmitted and/or received between the UE and the network. The user plane may be transmitted and/or received using a PDN connection or a PDU session. In addition, in a case of the EPS, the user plane may be transmitted and/or received using the LTE-Uu interface, and/or the S1-U interface, and/or the S5 interface, and/or the S8 interface, and/or the SGi interface. In addition, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, the control plane refers to a control message transmitted and/or received in order to perform communication control or the like of the UE. The control plane may be transmitted and/or received using Non-Access-Stratum (NAS) signaling connection between the UE and the MME. In addition, in a case of the EPS, the control plane may be transmitted and/or received using the LTE-Uu interface and the S1-MME interface. In addition, in a case of the 5GS, the control plane may be transmitted and/or received using the interface between the UE and the NG RAN and the N2 interface. The control plane may be hereinafter referred to as a control plane or may be hereinafter referred to as a C-Plane.

In addition, the User Plane (U-Plane (UP)) may be a communication path for transmitting and/or receiving user data and may include multiple bearers. In addition, the Control Plane (C-Plane (CP)) may be a communication path for transmitting and/or receiving a control message and may include multiple bearers.

2.6. Apparatus Configuration of NSACF

Next, an apparatus/functional configuration example of the NSACF used in each embodiment will be described with reference to FIG. 11. The NSACF is a function unit deployed in the core network. The NSACF includes the controller_700, the network connection unit_720, and the storage unit_740. The controller_700, the network connection unit_720, and the storage unit_740 are connected via a bus.

The controller_700 is a function unit for controlling the entire operations and functions of the NSACF. Note that the controller_700 may process all of the functions not included in other function units of the NSACF (the network connection unit_720 and the storage unit_740). The controller_700 reads and executes various programs stored in the storage unit_740 as necessary, thereby implementing various types of processing in an NSCAF.

The network connection unit_720 is a function unit for the NSACF to communicate with the AMF or the SMF. In other words, the NSACF can transmit and/or receive the control information to and/or from the AMF and/or the AMF by using the network connection unit_720.

In other words, the NSACF can communicate with the AMF over an N80 interface by using the network connection unit_720. The NSACF can communicate with the SMF over an N81 interface by using the network connection unit_720.

Note that the above description contains only the communication between the NSACF and representative apparatuses/functions and that the NSACF can of course communicate with apparatuses/functions other than those described above, that is, core network apparatuses other than those described above.

The storage unit_740 is a function unit for storing programs, user data, control information, and the like necessary for each operation of the NSACF.

The Network Slice Admission Control Function (NSACF) may be an NF for performing Network Slice Admission Control (NSAC). Specifically, the NSACF may be an NF that monitors and/or controls the number of registered UEs per network slice and/or the number of PDU sessions per network slice for a network slice (NS) subject to the Network Slice Admission Control (NSAC). The NSACF may be configured with information indicating which access type (that is, 3GPP access type, non-3GPP access type, or both) is specified for an S-NSSAI subject to the NSAC. In other words, in a case that the access type applied to the S-NSSAI subject to the NSAC is 3GPP access, the NSACF may subject a request message (for example, a registration request message or a PDU session establishment request message) transmitted via 3GPP access to the NSAC, but need not subject a request message transmitted via non-3GPP access to the NSAC. In a case that the access type applied to the S-NSSAI subject to the NSAC is non-3GPP access, the NSACF need not subject the request message (for example, the registration request message or the PDU session establishment request message) transmitted via 3GPP access to the NSAC, but may subject the request message transmitted via non-3GPP access to the NSAC. In a case that the access type applied to the S-NSSAI subject to the NSAC is 3GPP access and non-3GPP access, the NSACF may subject both the request message (for example, the registration request message or the PDU session establishment request message) transmitted via 3GPP access and the request message transmitted via non-3GPP access to the NSAC.

The NSACF is configured with the maximum number of UEs per NS and/or the maximum number of PDU sessions per NS that can be served by each NS subject to the NSAC. In other words, the NSACF may reject the request message in a case that the request message (for example, the registration request message or the PDU session establishment request message) transmitted to the NS subject to the NSAC exceeds the maximum number of UEs per NS and/or the maximum number of PDU sessions per NS that can be served by the NS. Conversely, the NSACF may allow the request message in a case that the request message (for example, the registration request message or the PDU session establishment request message) transmitted to the NS subject to the NSAC does not exceed the maximum number of UEs per NS and/or the maximum number of PDU sessions per NS that can be served by the NS.

According to operator policy and national/regional regulations, the AMF or the SMF may determine whether to exclude from the NSAC those NSs that are determined to include Emergency services and/or Critical and Priority services.

The NSACF controls (that is, increases or decreases) the number of UEs to be registered in the NS so as not to exceed the maximum number of UEs that can be registered in the NS. The NSACF holds a list of UE IDs registered in the NS subject to the NSAC. In a case that the number of UEs registered in the NS increases (that is, in a case of attempting to register a new UE in the NS), the NSACF checks whether the ID of the UE is present in the list held by the NSACF (the list of UE IDs registered in the NS). In a case that the ID of the UE is not present in the list held by the NSACF, the NSACF checks whether the maximum number of UEs per NS has been reached for the NS. In other words, in a case that the number of UEs registered in the NS increases (that is, in a case of attempting to register a new UE in the NS), the NSACF checks whether the ID of the UE is present in the list held by the NSACF (the list of UE IDs registered in the NS). In a case that the ID of the UE is present in the list held by the NSACF, the NSACF need not check whether the maximum number of Es per NS has been reached for the NS.

In a case that a registered state of the UE for the NS subject to the NSAC may change in the registration procedure, a deregistration procedure, an NSSAA procedure, and/or the like, the AMF may request the NSACF to perform control (that is, the NSAC) on the maximum number of UEs per NS. At this time, the AMF may transmit the access type to the NSACF. Specifically, in a case of registering or deregistering (also referred to as de-registration) for the S-NSSAI via 3GPP access and/or non-3GPP access, the AMF may transmit the access type to the NSACF.

The NSACF may consider this access type for an increase or decrease in the number of UEs per NS. The NSACF stores the UE ID and the access type in association with each other.

For example, in a case that information configured in the NSACF is only 3GPP access, the NSACF counts only registration via 3GPP access. In a case that the information configured in the NSACF is only non-3GPP access, the NSACF counts only registration via non-3GPP access. In a case that the information configured in the NSACF is 3GPP access and non-3GPP access, the NSACF counts only registration via 3GPP access or non-3GPP access.

In a case that the information configured in the NSACF is 3GPP access and non-3GPP access and the UE has already been registered via non-3GPP access and is newly registered via 3GPP access, the NSACF may update an association between the UE ID and the access type from the UE ID and non-3GPP to the UE ID and 3GPP and non-3GPP and store the updated association. In a case that the information configured in the NSACF is 3GPP access and non-3GPP access and the UE has already been registered via 3GPP access and is newly registered via non-3GPP access, the NSACF may update the association between the UE ID and the access type from the UE ID and 3GPP to the UE ID and 3GPP and non-3GPP and store the updated association.

The NSACF controls (that is, increases or decreases) the number of PDU sessions per NS so as not to exceed the maximum number of PDU sessions that can be served by the NS. In a case that the number of PDU sessions using the NS increases (that is, in a case that the UE attempts to establish a new PDU session for the NS), the NSACF checks whether the maximum number of PDU sessions per NS has been reached for the NS.

The SMF may request the NSACF to control the maximum number of PDU sessions per NS subject to the NSAC in a PDU session establishment procedure and a PDU session release procedure. At this time, the AMF may transmit the access type to the NSACF. Specifically, in a case of registering or deregistering (also referred to as de-registration) for the S-NSSAI via 3GPP access and/or non-3GPP access, the SMF may transmit the access type to the NSACF.

The NSACF may consider the access type for an increase or decrease in the number of PDU sessions per NS. The NSACF stores the PDU session ID and the access type in association with each other.

For example, in a case that the information configured in the NSACF is only 3GPP access, the NSACF counts only the establishment or release of the PDU session via 3GPP access. In a case that the information configured in the NSACF is only the non-3GPP access, the NSACF counts only the establishment or release of the PDU session via non-3GPP access. In a case that the information configured in the NSACF is 3GPP access and non-3GPP access, the NSACF counts only the establishment or release of the PDU session via 3GPP access or non-3GPP access.

In a case that the information configured in the NSACF is 3GPP access and non-3GPP access and the UE has already been registered via non-3GPP access and is newly registered via 3GPP access, the NSACF may update an association between the UE ID and the access type from the UE ID and non-3GPP to the UE ID and 3GPP and non-3GPP and store the updated association. In a case that the information configured in the NSACF is 3GPP access and non-3GPP access and the UE has already been registered via 3GPP access and is newly registered via non-3GPP access, the NSACF may update the association between the UE ID and the access type from the UE ID and 3GPP to the UE ID and 3GPP and non-3GPP and store the updated association.

2.7. Description of Other Apparatuses and/or Functions

Next, other apparatuses and/or functions will be described.

First, the Network Slice Selection Function (NSSF) may be a network function (also referred to as an NF) having a function of selecting a network slice serving the UE.

A Policy Control Function (PCF) may be an NF having a function of determining a policy for controlling a behavior of a network.

The network refers to at least a part of the access network, the core network, and the DN. One or more apparatuses included in at least a portion of the access network, the core network, or the DN may be referred to as a network or a network apparatus. In other words, “a network transmits and/or receives a message and/or performs processing” may mean “an apparatus (a network apparatus and/or a control apparatus) in the network transmits and/or receives the message and/or performs the processing”. Conversely, “an apparatus in a network transmits and/or receives a message and/or performs processing” may mean “the network transmits and/or receives the message and/or performs the processing”.

3. Description of Technical Terms Used in Present Embodiment

First, a Session Management (SM) message (also referred to as a Non-Access-Stratum (NAS) SM message) may be a NAS message used in a procedure for SM, or a control message transmitted and/or received between the UE and the SMF via the AMF. Furthermore, the SM message may include a PDU session establishment request message, a PDU session establishment accept message, a PDU session reject (PDU session establishment reject) message, a PDU session modification request message, a PDU session modification command message, a PDU session modification complete message (PDU session modification complete), a PDU session modification command reject message, a PDU session modification reject message, a PDU session release request message, a PDU session release reject message, a PDU session release command message, a PDU session release complete message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE or may be a procedure initiated by the NW.

A Mobility management (MM) message (also referred to as a NAS MM message) may be a NAS message used for a procedure for MM and may be a control message transmitted and/or received between the UE 10 and the AMF. In addition, the MM message may include a Registration request message, a Registration accept message, a Registration reject message, a Registration complete message, a De-registration request message, a De-registration accept message, a configuration update command message, a configuration update complete message, a Service request message, a Service accept message, a Service reject message, a Notification message, a Notification response message, and the like.

The procedure for MM or an MM procedure may include the Registration procedure, the De-registration procedure, a Generic UE configuration update procedure, the Service request procedure, a Paging procedure, and a Notification procedure.

Here, the registration procedure may be the procedure initiated by the UE. There may be the de-registration procedure, the procedure initiated by the UE, and the procedure initiated by the network. The generic UE configuration update procedure may be the procedure initiated by the network. The service request procedure may be the procedure initiated by the UE. The paging procedure may be the procedure initiated by the network. The notification procedure may be the procedure initiated by the network.

Here, the registration request message transmitted in the registration procedure may be a message transmitted by the UE to the AMF. The registration accept message transmitted in the registration procedure may be a response message to the registration request message and may be a message transmitted by the AMF to the UE in a case that the registration request is allowed. The registration reject message transmitted in the registration procedure may be a response message to the registration request message and may be a message transmitted by the AMF to the UE in a case that the registration request is not allowed. The registration complete message transmitted in the registration procedure may be a response message to the registration accept message and may be a message transmitted by the UE to the AMF.

The de-registration request message transmitted in the de-registration procedure initiated by the UE may be a message transmitted by the UE to the AMF. A de-registration accept message transmitted in the de-registration procedure initiated by the UE may be a response message to the de-registration request message and may be a message transmitted by the AMF to the UE.

The de-registration request message transmitted in the de-registration procedure initiated by the network may be a message transmitted by the AMF to the UE. The de-registration accept message transmitted in the de-registration procedure initiated by the network may be a response message to the de-registration request message and may be a message transmitted by the UE to the AMF.

The configuration update command message transmitted in the generic UE configuration update procedure may be a message transmitted by the AMF to the UE. The configuration update complete message transmitted in the generic UE configuration update procedure may be a response message to the configuration update command message and may be a message transmitted by the UE to the AMF.

The service request message transmitted in the service request procedure may be a message transmitted by the UE to the AMF. The service accept message transmitted in the service request procedure may be a response message to the service request message and may be a message transmitted by the AMF to the UE in a case that the service request is allowed. The service reject message transmitted in the service request procedure may be a response message to the service request message and may be a message transmitted by the AMF to the UE in a case that the service request is not allowed.

A Request paging message transmitted in the paging procedure may be a message transmitted by the AMF to the base station apparatus. A Paging message transmitted in the paging procedure may be a message transmitted to the UE by the base station apparatus that has received the paging request (Request paging) message. Performing the registration procedure or the service request procedure may be triggered by the Paging message transmitted in the paging procedure.

The notification message transmitted in the notification procedure may be a message transmitted by the AMF to the UE. The notification response message transmitted in the notification procedure may be a response message to the notification message and may be a message transmitted by the UE to the AMF. Performing the registration procedure or the service request procedure may be triggered by the notification message transmitted in the notification procedure.

Next, some timers will be described below.

First, a timer T3510 and a timer T3550 may be timers used in the registration procedure. Here, the timer T3510 may be a timer operable in the UE, which is started in a case that the UE transmits the registration request message and is stopped in a case that the UE receives the registration accept message or the registration reject message. The timer T3550 may be a timer operable in the AMF, which is started in a case that the AMF transmits the registration accept message and is stopped in a case that the AMF receives the registration complete message.

A timer T3521 may be a timer used in the de-registration procedure initiated by the UE. Here, the timer T3521 may be a timer that is started in a case that the UE transmits the de-registration request message and is stopped in a case that the UE receives the de-registration accept message.

A timer T3522 may be a timer used in the de-registration procedure initiated by the network. Here, the timer T3522 may be a timer that is started in a case that the AMF transmits the de-registration request message and is stopped in a case that the AMF receives the de-registration accept message.

A timer T3517 may be a timer used in the service request procedure. Here, the timer T3517 may be a timer that is started in a case that the UE transmits the service request message and is stopped in a case that the UE receives the service accept message or the service reject message.

A timer T3513 may be a timer used in the paging procedure. Here, the timer T3513 may be a timer that is started in a case that the AMF transmits the paging request message and is stopped in a case that the registration request message or the service request message is received.

A timer T3565 may be a timer used in the notification procedure. Here, the timer T3565 may be a timer that is started in a case that the AMF transmits the notification message and is stopped in a case that the registration request message or the service request message, or the notification response message is received.

A timer T3427 may be a timer that is started in a case that the MM message such as the registration reject message or the service reject message is received and is stopped in a case that a SIM or a USIM is removed from the UE, or the UE is powered off.

A 5G System (5GS) service may be a connection service provided using the core network. In addition, the 5GS service may be a service different from an EPS service or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. By establishing a PDU session in the 5GS via the access network and the core network, the UE can transmit and/or receive user data to and/or from the DN by using the PDU session. Here, the external gateway may be a UPF, an SCEF, or the like. The UE can perform transmission and/or reception of user data to and/or from an apparatus deployed in the DN, such as an application server, by using the PDU session.

Note that each apparatus (the UE, and/or the access network apparatus, and/or the core network apparatus) may associate one or more pieces of identification information with a PDU session for management. Note that these pieces of identification information may include one or more of a DNN, a QoS rule, a PDU session type, application identification information, NSI identification information, and access network identification information, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. Further, the DNN can also be used as information for selecting a gateway such as a PGW/UPF connecting the core network. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a network operator, and the operator can be identified by a PLMN ID. A PLMN that matches a Mobile Network Code (MNC) and a Mobile Country Code (MCC) of an International Mobile Subscriber Identity (IMSI) of the UE may be a Home PLMN (HPLMN). Furthermore, the UE may hold, in the USIM, an Equivalent HPLMN list for identifying one or multiple Equivalent HPLMNs (EPLMNs). A PLMN different from the HPLMN and/or the EPLMN may be a VPLMN (Visited PLMN). A PLMN with which the UE has successfully registered may be a Registered PLMN (RPLMN). Note that a service provided by the PLMN may be referred to as a PLMN service, and a service provided by an SNPN may be referred to as an SNPN service.

The SNPN is a type of NPN being a 5GS deployed for non-public use and is an NPN that is operated by an NPN operator and that is not dependent on the NF provided by the PLMN. The SNPN is identified by a combination of a PLMN ID and a Network Identifier (NID). The UE that can use the SNPN may support an SNPN access mode. The UE configured to operate in the SNPN access mode may be able to select the SNPN and be registered with the SNPN or need not be able to select the PLMN. The UE configured to operate in the SNPN access mode may be able to perform an SNPN selection procedure or need not be able to perform a PLMN selection procedure. The UE not configured to operate in the SNPN access mode although the UE can use the SNPN (SNPN enabled) need not be able to select the SNPN and be registered with the SNPN or may be able to select the PLMN. The UE not configured to operate in the SNPN access mode need not be able to perform the SNPN selection procedure or may be able to perform the PLMN selection procedure.

The UE operating in the SNPN access mode may be able to select the SNPN via Uu (3GPP access). The UE operating in the SNPN access mode may be able to select the SNPN via Uu or NWu established via a PDU session provided by the PLMN selected via Uu or NWu (non-3GPP access). The UE not operating in the SNPN access mode may be able to select the PLMN via Uu or NWu established via a PDU session provided by the SNPN selected via Uu or NWu (non-3GPP access).

Note that the SNPN access mode may be managed and applied in an access unit. In other words, the SNPN access mode may be managed and applied separately for 3GPP access and non-3GPP access. In other words, activation or deactivation of the SNPN access mode for 3GPP access and activation or deactivation of the SNPN access mode for non-3GPP access may be independent of each other. In other words, in a case that the SNPN access mode for 3GPP access is activated, the SNPN access mode for non-3GPP access may be activated or may be deactivated. In a case that the SNPN access mode for 3GPP access is deactivated, the SNPN access mode for non-3GPP access may be activated or may be deactivated.

Here, the SNPN access mode for 3GPP access may also be referred to as the SNPN access mode over 3GPP access or the SNPN access mode via 3GPP access.

The SNPN access mode for non-3GPP access may be referred to as the SNPN access mode over non-3GPP access or the SNPN access mode via non-3GPP access.

"To activate" may be interpreted as "to operate", and "to deactivate" may be interpreted as "not to operate". In other words, activation of the SNPN access mode for 3GPP access may mean to operate in the SNPN access mode for 3GPP access. Deactivation of the SNPN access mode for 3GPP access may mean not to operate in the SNPN access mode for 3GPP access. Activation of the SNPN access mode for non-3GPP access may mean to operate in the SNPN access mode for non-3GPP access. Deactivation of the SNPN access mode for non-3GPP access may mean not to operate in the SNPN access mode for non-3GPP access.

As states of the SNPN access mode in the UE, there may be the following first state to ninth state.

Here, the first state is a state in which the UE does not operate in the SNPN access mode.

The second state is a state in which the UE operates in the SNPN access mode.

The third state is a state of not operating in the SNPN access mode on 3GPP access and of not operating in the SNPN access mode on non-3GPP access.

The fourth state is a state of not operating in the SNPN access mode on 3GPP access and of operating in the SNPN access mode on non-3GPP access.

The fifth state is a state of operating in the SNPN access mode on 3GPP access and of not operating in the SNPN access mode on non-3GPP access.

The sixth state is a state of operating in the SNPN access mode on 3GPP access and operating in the SNPN access mode on the non-3GPP access.

The seventh state is a state of operating in the SNPN access mode in a case of being connected to the SNPN service and is a state of not operating in the SNPN access mode in a case of being connected to the PLMN service.

The eighth state is a state of operating in the SNPN access mode for the SNPN and of not operating in the SNPN access mode for the PLMN, in a case of being connected to the SNPN via non-3GPP access and connected to the PLMN via non-3GPP access. The eighth state may be a state of operating in the SNPN access mode for the SNPN and of not operating in the SNPN access mode for the PLMN, in a case of being connected to the SNPN via 3GPP access and connected to the PLMN via 3GPP access.

The ninth state is a state of not operating in the SNPN access mode for the PLMN and of operating in the SNPN access mode for the SNPN, in a case of being connected to the PLMN via non-3GPP access and connected to the SNPN via non-3GPP access. The ninth state may be a state of not operating in the SNPN access mode for the PLMN and of operating in the SNPN access mode for the SNPN, in a case of being connected to the PLMN via 3GPP access and connected to the SNPN via 3GPP access.

Note that the first state, the second state, the seventh state, the eighth state, and the ninth state may be states applied in a case that the SNPN access mode is not managed in the access unit. The third state, the fourth state, the fifth state, and the sixth state may be states applied in a case that the SNPN access mode is managed in the access unit. The seventh state and the eighth state may be states applied in a case of being connected to the PLMN service via the SNPN. The seventh state and the ninth state may be states applied in a case of being connected to the SNPN service via the PLMN.

A network slice (NS) is a logical network that provides specific network capability and network characteristics. The UE and/or the network can support the network slice (NW slice (NS)) in the 5GS. The network slice may simply be referred to as a slice.

A network slice instance (NSI) includes a set of an instance (entity) of a network function (NF) and necessary resources and forms a network slice to be mapped. Here, the NF is a processing function in a network and is adopted or defined in 3GPP. The NSI is an entity of one or more NSs configured in the core network. The NSI may include a virtual Network Function (NF) generated using a Network Slice Template (NST). Here, the NST is associated with a resource request for provision of a requested communication service and capability and is a logical expression of one or more NFs. Specifically, the NSI may be an aggregation including multiple NFs in the core network. The NSI may be a logical network configured for classifying user data to be delivered depending on a service or the like. In the NS, one or more NFs may be configured. Each NF configured in the NS may or may not be an apparatus shared with another NS. The UE and/or the apparatus in the network can be allocated to one or more NSs, based on an NSSAI, and/or an S-NSSAI, and/or a UE usage type, and/or registration information such as one or more NSI IDs, and/or an APN. Note that the UE usage type is a parameter value included in registration information of the UE, which is used for identifying the NSI. The UE usage type may be stored in the HSS. The AMF may select the SMF and the UPF, based on the UE usage type.

The Single Network Slice Selection Assistance Information (S-NSSAI) is information for identifying the NS. The S-NSSAI may include only a Slice/Service type (SST) or may include both of an SST and a Slice Differentiator (SD). Here, the SST is information indicating operation of the NS expected in terms of functions and services. The SD may be information for interpolating an SST in a case of selecting one NSI out of multiple NSIs indicated by the SST. The S-NSSAI may be information unique to each PLMN or may be standard information common to the PLMNs. The network may store one or more pieces of S-NSSAI in the registration information of the UE as default S-NSSAI. Note that, in a case that the S-NSSAI is a default S-NSSAI, and the UE does not transmit, to a network, a valid S-NSSAI in a registration request message, the network may provide an NS related to the UE.

The Network Slice Selection Assistance Information (NSSAI) is a set of pieces of the S-NSSAI. Each piece of the S-NSSAI included in the NSSAI is information for assisting the access network or the core network to select the NSI. The UE may store the NSSAI allowed by the network for each PLMN. The NSSAI may be information used for selecting the AMF.

Configured NSSAI is NSSAI supplied and stored in the UE. The UE may store the configured NSSAI for each PLMN. The configured NSSAI may be information configured by the network (or PLMN). The S-NSSAI included in the configured NSSAI may be referred to as configured S-NSSAI. The configured S-NSSAI may include S-NSSAI and mapped S-NSSAI.

Requested NSSAI is NSSAI provided to the network from the UE during the registration procedure. The requested NSSAI may be allowed NSSAI or configured NSSAI stored by the UE. Specifically, the requested NSSAI may be information indicating a network slice that the UE is to access. The S-NSSAI included in the requested NSSAI may be referred to as requested S-NSSAI. For example, the requested NSSAI is transmitted in the NAS message transmitted from the UE to the network such as the registration request message or the PDU session establishment request message, or a Radio Resource Control (RRC) message including the Non-Access-Stratum (NAS) message.

Allowed NSSAI is information indicating one or multiple network slices allowed for the UE. In other words, the allowed NSSAI is information identifying a network slice to which the UE is allowed by the network to connect. As information of the UE, each of the UE and the network stores and manages the allowed NSSAI for each access (3GPP access or non-3GPP access). The S-NSSAI included in the allowed NSSAI may be referred to as an allowed S-NSSAI. The allowed S-NSSAI may include S-NSSAI and mapped S-NSSAI.

Mapped S-NSSAI is an S-NSSAI of the HPLMN mapped to the S-NSSAI of a registered PLMN in a roaming scenario. The UE may store one or multiple mapped S-NSSAIs mapped to the configured NSSAI and the S-NSSAI included in the Allowed NSSAI of each access type. In addition, the UE may store one or multiple mapped S-NSSAIs of the S-NSSAI included in a rejected NSSAI.

Rejected NSSAI is information indicating one or multiple network slices not allowed for the UE. In other words, the rejected NSSAI is information identifying a network slice to which the UE is not allowed by the network to connect. The rejected NSSAI may be information including one or multiple combinations of S-NSSAI and a reject cause value. Here, the reject cause value is information indicating why the network rejects the corresponding S-NSSAI. The UE and the network may each appropriately store and manage the rejected NSSAI based on the reject cause value associated with each piece of S-NSSAI. Furthermore, the rejected NSSAI may be included in the NAS message transmitted from the network to the UE, such as the registration accept message, the configuration update command, or the registration reject message, or in the RRC message including the NAS message. The S-NSSAI included in the rejected NSSAI may be referred to as a rejected S-NSSAI. The rejected NSSAI may be one of the first to third rejected NSSAIs and a pending NSSAI or may be a combination of these. The S-NSSAI included in the rejected NSSAI may be referred to as a rejected S-NSSAI. The rejected S-NSSAI may include the S-NSSAI and the mapped S-NSSAI.

Here, the first rejected NSSAI is a set of one or more pieces of the S-NSSAI included in the requested NSSAI by the UE, the one or more pieces of S-NSSAI being not available in the current PLMN. The first rejected NSSAI may be Rejected NSSAI for the current PLMN in the 5GS, may be Rejected S-NSSAI for the current PLMN or may be S-NSSAI included in the Rejected NSSAI for the current PLMN. The first rejected NSSAI may be a rejected NSSAI stored by the UE or the NW or may be a rejected NSSAI transmitted from the NW to the UE. In a case that the first rejected NSSAI is rejected NSSAI transmitted from the NW to the UE, the first rejected NSSAI may be information including one or multiple combinations of S-NSSAI and a cause value. The reject cause value in this case may be "S-NSSAI is not available in the current PLMN" or may be information indicating that the S-NSSAI associated with the reject cause value is not available in the current PLMN.

The first rejected NSSAI is valid in the entire registered PLMN. In other words, the UE and/or NW may treat the first rejected NSSAI and the S-NSSAI included in the first rejected NSSAI as information not dependent on the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, the UE deletes the first rejected NSSAI in a case that the UE transitions to the deregistered state for the current PLMN via one certain access, or in a case that the UE successfully registers with a new PLMN via one certain access, or in a case that the UE fails to register with a new PLMN via one certain access and transitions to the deregistered state, and further that the UE is not registered (deregistered state) via the other access.

The second rejected NSSAI is a set of one or multiple S-NSSAIs unavailable in the current registration area among the S-NSSAIs that the UE includes in the requested NSSAI. The second rejected NSSAI may be Rejected NSSAI for the current registration area in the 5GS. The second rejected NSSAI may be a rejected NSSAI stored by the UE or the NW or may be a rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The cause value in this case may be "S-NSSAI is not available in the current registration area" or may be information indicating that the S-NSSAI associated with the cause value is not available in the current registration area.

The second rejected NSSAI is valid in the current registration area. In other words, the UE and/or the NW may treat the second rejected NSSAI and the S-NSSAI included in the second rejected NSSAI as information for each access type. In other words, the second rejected NSSAI may be information valid for each of 3GPP access and non-3GPP access. In other words, once the UE transitions to the deregistered state for one access, the UE may delete the second rejected NSSAI from the storage.

The third rejected NSSAI is a set of one or multiple S-NSSAIs that require NSSAA and for which the NSSAA fails or is revoked. The third rejected NSSAI may be an NSSAI stored by the UE and/or the NW or may be transmitted from the NW to the UE. In a case that the third rejected NSSAI is transmitted from the NW to the UE, the third rejected NSSAI may be information including one or multiple combinations of S-NSSAI and a reject cause value. The reject cause value in this case may be "S-NSSAI not available due to failure or revocation of NSSAA (S-NSSAI is not available due to the failed or revoked network slice-specific authorization and authentication)" and may be information indicating that the NSSAA for the S-NSSAI associated with the reject cause value has failed or has been revoked.

The third rejected NSSAI is valid in the entire registered PLMN. In other words, the UE and/or the NW may treat the third rejected NSSAI and S-NSSAI included in the third rejected NSSAI as information not dependent on the access type. In other words, the third rejected NSSAI may be valid information for 3GPP access and non-3GPP access. The third rejected NSSAI may be NSSAI different from the rejected NSSAI. The third rejected NSSAI may be the first rejected NSSAI.

The third rejected NSSAI is a rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple pieces of S-NSSAI received from the core network in association with the reject cause value indicating failure of NSSAA. The third rejected NSSAI is information not dependent on the access type. Specifically, in a case of storing the third rejected NSSAI, the UE need not attempt to transmit, either on 3GPP access or on non-3GPP access, the registration request message including the S-NSSAI included in the third rejected NSSAI. Alternatively, the UE can transmit the registration request message including the S-NSSAI included in the third rejected NSSAI, based on a UE policy. Alternatively, the UE may delete the third rejected NSSAI based on the UE policy and transition to a state in which the UE can transmit the registration request message including the S-NSSAI included in the third rejected NSSAI. In other words, in a case that the UE transmits, based on the UE policy, the registration request message including the S-NSSAI included in the third rejected NSSAI, the UE may delete the S-NSSAI from the third rejected NSSAI.

The pending NSSAI (also referred to as pending NSSAI or Pending NSSAI) is a set of one or multiple S-NSSAIs that require network slice specific authentication by the network, for which the network slice specific authentication bas not completed yet, and that are not available in the current PLMN. The pending NSSAI may be a Rejected NSSAI due to NSSAA or a pending NSSAI of the 5GS. The pending NSSAI may be a NSSAI stored by the UE or the NW and may be an NSSAI transmitted from the NW to the UE. Note that the pending NSSAI is not limited to the rejected NSSAI and may be an NSSAI independent of the rejected NSSAI. In a case that the pending NSSAI is NSSAI transmitted from the NW to the UE, the pending NSSAI may be information including one or multiple combinations of S-NSSAI and a reject cause value. The reject cause value in this case may be "S-NSSAI pending for NSSAA (NSSAA is pending for the S-NSSAI)" or may be information indicating that the UE is forbidden from or pending using the S-NSSAI associated with the reject cause value until NSSAA for the S-NSSAI completes.

The pending NSSAI is valid in the entire registered PLMN. In other words, the UE and/or the NW may treat the third rejected NSSAI and the S-NSSAI included in the pending NSSAI as information not dependent on the access type. In other words, the pending NSSAI may be information valid for 3GPP access and non-3GPP access. The pending NSSAI may be NSSAI different from the rejected NSSAI. The pending NSSAI may be first rejected NSSAI.

The pending NSSAI is the NSSAI including one or multiple S-NSSAIs allowing the UE to identify the slice in which the procedure is pending Specifically, while storing the pending NSSAI, the UE does not initiate the registration request procedure for the S-NSSAI included in the pending NSSAI. In other words, the UE does not use the S-NSSAI included in the pending NSSAI during the registration procedure until NSSAA for the S-NSSAI included in the pending NSSAI completes. The pending NSSAI is identification information including one or multiple S-NSSAIs received from the core network in association with the reject cause value indicating pending for NSSAA. The pending NSSAI is information not dependent on the access type. Specifically, in a case of storing the pending NSSAI, the UE attempts to transmit, neither on 3GPP access nor on non-3GPP access, the registration request message including the S-NSSAI included in the pending NSSAI.

The allowed NSSAI, the rejected NSSAI, the configured NSSAI, and the pending NSSAI may be included in the MM message transmitted from the network.

A tracking area is a single or multiple ranges that can be expressed using the location information of the UE managed by the core network. The tracking area may include multiple cells. In addition, the tracking area may be an area in which the control message such as paging is broadcast or may be an area in which the UE can move without performing a handover procedure. In addition, the tracking area may be a routing area or may be a location area. The tracking area may be any area as long as the area is similar to these. The tracking area may be hereinafter a Tracking Area (TA). The tracking area may be identified by a Tracking Area Identity (TAI) including a Tracking area code (TAC) and the PLMN.

Registration area is a set of one or multiple TAs allocated to the UE by the AMF. Note that while moving within one or multiple TAs included in the registration area, the UE may be able to move without transmitting and/or receiving a signal for updating the tracking area. In other words, the registration area may be an information group indicating an area in which the UE can move without performing a tracking area update procedure. The registration area may be identified with a TAI list including one or multiple TAIs.

The UE ID is information for identifying the UE. Specifically, the UE ID may be a SUbscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Network Slice-Specific Authentication and Authorization (NSSAA) is a function for implementing network slice specific authentication and authorization. The network slice-specific authentication and authorization allows the UE to be authenticated and authorized outside the core network, such as in a 3rd Party. The PLMN and the network apparatus having the NSSAA function can perform an NSSAA procedure for a certain S-NSSAI, based on registration information of the UE. Furthermore, the UE having the NSSAA function can manage and store the rejected NSSAI for pending for NSSAA and/or the rejected NSSAI for failure of NSSAA. In the present document, NSSAA may be referred to as a network slice specific authentication and authorization procedure or an authentication and authorization procedure.

The S-NSSAI that requires NSSAA is an S-NSSAI that requires NSSAA managed by the core network and/or the core network apparatus. The core network and/or the core network apparatus may store the S-NSSAI that requires NSSAA by associating the S-NSSAI and information indicating whether NSSAA is required. The core network and/or the core network apparatus may further store the S-NSSAI that requires NSSAA in association with information indicating whether NSSAA has completed or information indicating NSSAA has completed and the state is an allowed or success state. The core network and/or the core network apparatus may manage the S-NSSAI that requires NSSAA as information unrelated to the access network.

A Uu interface (hereinafter also referred to as a Uu) may refer to an interface between a base station apparatus installed in 3GPP access or 3GPP access and UE. The Uu may be used herein as synonymous with 3GPP access. An NWu interface (hereinafter also simply referred to as an NWu) may refer to an interface between the N3IWF and the UE. The NWu may be used herein as synonymous with non-3GPP access.

An NSSAI inclusion mode is information that is included in the NSSAI inclusion mode information element (IE) of the MM message (for example, the registration accept message) and notified to the UE by the AMF, and is a mode in a case that the UE operates via a current access (3GPP access and/or non-3GPP access) in the current PLMN or SNPN. In other words, the NSSAI inclusion mode IE may be used to indicate the NSSAI inclusion mode in which the UE operates The NSSAI inclusion mode included in the NSSAI inclusion mode may be information equal to or greater than 2 bits. The NSSAI inclusion mode may be included in the MM message in a case that it is required by the operator policy.

The NSSAI inclusion mode may include NSSAI inclusion mode A, NSSAI inclusion mode B, NSSAI inclusion mode C, and NSSAI inclusion mode D. Then, the AMF may select the NSSAI inclusion mode to be included in the MM message from among the NSSAI inclusion mode A, the NSSAI inclusion mode B, the NSSAI inclusion mode C, and the NSSAI inclusion mode D.

Note that the NSSAI inclusion mode A is a mode in which the Requested NSSAI is used in a registration request message including a 5GS registration type IE (hereinafter, also referred to as a 5GS registration type) set in the initial registration, the Requested NSSAI is used in a registration request message including the 5GS registration type IE set in mobility registration updating in a case that the registration procedure is initiated by a condition other than a predetermined condition (hereinafter, also referred to as a first condition), the Allowed NSSAI is used in a registration request message including the 5GS registration type IE set in the mobility registration updating in a case that the registration procedure is initiated by the predetermined condition (the first condition), the Allowed NSSAI is used in a registration request message including the 5GS registration type IE set in periodic registration updating, and the Allowed NSSAI is used in the service request message. Here, the predetermined condition may be a case where the UE changes 5GMM capability and/or S1 UE network capability, or a case where the UE in the 5GMM-IDLE mode changes radio capability for the NG-RAN or the E-UTRAN.

The NSSAI inclusion mode B is a mode in which the Requested NSSAI is used in a registration request message including a 5GS registration type IE (hereinafter, also referred to as a 5GS registration type) set in the initial registration, the Requested NSSAI is used in a registration request message including the 5GS registration type IE set in mobility registration updating in a case that the registration procedure is initiated by a condition other than a predetermined condition (a first condition), the Allowed NSSAI is used in a registration request message including the 5GS registration type IE set in the mobility registration updating in a case that the registration procedure is initiated by the predetermined condition (the first condition), the Allowed NSSAI is used in a registration request message including the 5GS registration type IE set in the periodic registration updating, and in the service request message, all S-NSSAIs of the PDU session having a user plane resource required to be reestablished by the service request procedure, or the S-NSSAI of control plane interaction that triggered the service request or the service request procedure are used. Here, the first condition is as described above.

The NSSAI inclusion mode C is a mode in which the Requested NSSAI is used in a registration request message including a 5GS registration type IE (hereinafter, also referred to as a 5GS registration type) set in the initial registration, the Requested NSSAI is used in a registration request message including the 5GS registration type IE set in mobility registration updating in a case that the registration procedure is initiated by a condition other than a predetermined condition (a first condition), no NSSAI is used in a registration request message including the 5GS registration type IE set in the mobility registration updating in a case that the registration procedure is initiated by the predetermined condition (the first condition), the no NSSAI is used in a registration request message including the 5GS registration type IE set in the periodic registration updating, and the no NSSAI is used in the service request message. Here, the first condition is as described above.

The NSSAI inclusion mode D is a mode in which the no NSSAI is used in a registration request message including a 5GS registration type IE (hereinafter, also referred to as a 5GS registration type) set in the initial registration, the no NSSAI is used in a registration request message including the 5GS registration type IE set in mobility registration updating in a case that the registration procedure is initiated by a condition other than a predetermined condition (a first condition), the no NSSAI is used in a registration request message including the 5GS registration type IE set in the mobility registration updating in a case that the registration procedure is initiated by the predetermined condition (the first condition), the no NSSAI is used in a registration request message including the 5GS registration type IE set in the periodic registration updating, and the no NSSAI is used in the service request message. Here, the first condition is as described above.

The 5GS registration type (the 5GS registration type IE) may indicate the initial registration, the mobility registration updating, the periodic registration updating, or emergency registration.

3. Behavior of UE and/or NW with Respect to Equivalent SNPN

Next, an equivalent SNPN will be described. A behavior of the UE and/or the NW with respect to the equivalent NSSAI will be described.

First, in a case that the UE roams between SNPNs, the SNPNs may be classified into a Home SNPN (also referred to as an HSNPN) and a Visited SNPN (also referred to as a VSNPN). Note that, in a case that the UE does not roam between the SNPNs, the SNPNs may be handled as being the same as the Home SNPN.

The Home SNPN may be an SNPN in which the UE can be registered as a home. The Home SNPN may be an SNPN that the UE selects first in SNPN selection. The Home SNPN may be an SNPN in which at least a part of information included in an SNPN identity (also referred to as an SNPN ID) matches at least a part of information included in an IMSI of the UE. The Home SNPN may be an SNPN in which the MCC and the MNC included in a PLMN Identity (also referred to as a PLMN ID) included in an SNPN identity (also referred to as an SNPN ID) match the MCC and the MNC included in the IMSI of the UE.

The Visited SNPN may be an SNPN in which the UE can be registered as other than a home. The Visited SNPN may be an SNPN in which the UE is not registered as a home. The Visited SNPN may be an SNPN that the UE does not select first in SNPN selection. The Visited SNPN may be an SNPN in which at least a part of information included in the SNPN identity (also referred to as an SNPN ID) does not match at least a part of information included in the IMSI of the UE. The Visited SNPN may be an SNPN in which the MCC and the MNC included in the PLMN Identity (also referred to as a PLMN ID) included in the SNPN identity (also referred to as an SNPN ID) do not match the MCC and the MNC included in the IMSI of the UE.

An equivalent HSNPN (also referred to as an equivalent Home SNPN or an EHSNPN) may be an SNPN considered to be equivalent to the current SNPN (here, the Home SNPN (also referred to as an HSNPN)) in SNPN selection, and/or cell selection, and/or cell reselection. The equivalent HSNPN may be one or more SNPNs included in an equivalent HSNPN list or may be one or more SNPNs not included in an equivalent VSNPN list.

An equivalent VSNPN (also referred to as an equivalent Visited SNPN or an EVSNPN) may be an SNPN considered to be equivalent to the current SNPN (here, the Visited SNPN (also referred to as a VSNPN)) in SNPN selection, and/or cell selection, and/or cell reselection. The equivalent VSNPN may be one or more SNPNs included in the equivalent VSNPN list or may be one or more SNPNs not included in the equivalent HSNPN list.

An equivalent SNPN (also referred to as an ESNPN) may be a concept including the equivalent HSNPN and/or the equivalent VSNPN. In other words, the ESNPN may mean the equivalent HSNPN and/or the equivalent VSNPN.

Next, the equivalent HSNPN list (also referred to as an EHSNPN list) will be described. In order to be able to provide multiple HSNPN codes (also referred to as a Home SNPN code, a Home SNPN identity, or a Home SNPN ID), an SNPN code (also referred to as an SNPN identity or an SNPN ID) present in the EHSNPN list may be replaced by an HSNPN code obtained from the IMSI during or for SNPN selection. The EHSNPN list may be stored in the USIM. The EHSNPN list may include the HSNPN code obtained from the IMSI. In a case that the HSNPN code obtained from the IMSI is not present in the EHSNPN list, the HSNPN code may be handled as the Visited SNPN during or for SNPN selection.

Next, the equivalent VSNPN list (also referred to as an EVSNPN list) will be described. In order to be able to provide multiple VSNPN codes (also referred to as a Visited SNPN code, a Visited SNPN identity, or a Visited SNPN ID), the SNPN code (also referred to as the SNPN identity or the SNPN ID) present in the EVSNPN list may be replaced by a VSNPN code obtained from the IMSI during or for SNPN selection. The EVSNPN list may be stored in the USIM. The EVSNPN list may include the HVNPN code obtained from the IMSI. In a case that the VSNPN code obtained from the IMSI is not present in the EVSNPN list, the VSNPN code may be handled as the Home SNPN during or for SNPN selection.

An equivalent SNPN list (also referred to as an ESNPN list) may be a concept including the EHSNPN list and/or the EVSNPN list. In other words, the ESNPN list may indicate the EHSNPN list and/or the EVSNPN list.

The UE may store the equivalent SNPN list transmitted from the network. For example, in a case that the UE receives the MM message (for example, the registration request message, the configuration update command, or the like) transmitted by the AMF, the UE may store the equivalent SNPN list included in the MM message.

The UE may treat the equivalent SNPN as being equivalent to each other with the current SNPN (Home SNPN or Visited SNPN) at the time of SNPN selection, cell selection, and/or cell reselection. In other words, in a case that the UE cannot select the Home SNPN at the time of SNPN selection, the UE may preferentially select the equivalent SNPN (the equivalent Home SNPN) treated as equivalent to the Home SNPN. In a case that the UE cannot select the Home SNPN at the time of cell selection and/or cell reselection in the SNPN, the UE may preferentially select the equivalent SNPN (the equivalent Home SNPN) treated as equivalent to the Home SNPN.

The UE may update or delete the equivalent SNPN list every time the registration procedure ends.

The UE may maintain the equivalent SNPN list in a case that the UE is switched off. This may be for subsequent use in SNPN selection in a case that the power is turned on.

The UE may delete the equivalent SNPN list in a case that the USIM is removed from the UE or in a case that the UE registered for the emergency service enters 5GMM-DEREGISTERED.

The AMF may include the equivalent SNPN list in the registration accept message in the registration procedure. The equivalent SNPN list may include one or more SNPN codes (also referred to as SNPN IDs) including a combination of a PLMN code (also referred to as a PLMN ID) and the NID. In a case that the equivalent SNPN list is included in the registration accept message, the UE may update the stored equivalent SNPN list with the received list. In a case that the equivalent SNPN list is not included in the registration accept message, the UE may delete the stored equivalent SNPN list.

In a case that the UE performs the registration procedure and the procedure is not performed for the emergency service, the UE may delete the SNPN code (also referred to as the SNPN ID) present in a permanently forbidden SNPNs list or a temporarily forbidden SNPNs list from the equivalent SNPN list.

In the registration procedure initiated by the UE, in a case that the UE receives a registration reject message without integrity protection including a 5GMM cause value (5GSM cause value) indicating illegal UE, illegal ME, 5GS services not allowed, Tracking area not allowed, Roaming not allowed in this tracking area, No suitable cells in tracking area, N1 mode not allowed, Non-3GPP access to 5GCN not allowed (alternatively, it may be expressed that connection from non-3GPP access to 5GCN is not allowed, or the like), Temporarily not authorized for this SNPN, or Permanently not authorized for this SNPN, the UE may stop the running timer T3510 or timer T3517, and may start a timer T3247, in a case that the timer T3247 is not running, to delete the equivalent SNPN list.

In the service request procedure initiated by the UE, in a case that the UE receives a service reject message without integrity protection including a 5GMM cause value (5GSM cause value) indicating illegal UE, illegal ME, 5GS services not allowed, Tracking area is not allowed, Roaming not allowed in this tracking area, No suitable cells in tracking area, N1 mode not allowed, Non-3GPP access to 5GCN not allowed (alternatively, it may be expressed that connection from non-3GPP access to 5GCN is not allowed, or the like), Temporarily not authorized for this SNPN, or Permanently not authorized for this SNPN, the running timer T3510 or timer T3517 may be stopped, and in a case that a timer T3247 is not running, the timer T3247 may be started to delete the equivalent SNPN list.

In the de-registration procedure initiated by the network, in a case that the UE receives a de-registration request message without integrity protection including a 5GMM cause value (5GSM cause value) indicating illegal UE, illegal ME, 5GS services not allowed, Tracking area not allowed, Roaming not allowed in this tracking area, No suitable cells in tracking area, N1 mode not allowed, Non-3GPP access to 5GCN not allowed (alternatively, it may be expressed that connection from non-3GPP access to 5GCN is not allowed, or the like), Temporarily not authorized for this SNPN, or Permanently not authorized for this SNPN, the equivalent SNPN list may be deleted.

The UE may include information indicating whether the UE supports the equivalent SNPN or the equivalent SNPN list into the registration request message, and may transmit the registration request message. The AMF may transmit information indicating whether the network supports the equivalent SNPN or the equivalent SNPN list by including the information in the registration accept message or the registration reject message. Specifically, based on the information indicating whether the UE supports the equivalent SNPN or the equivalent SNPN list included in the registration request message received from the UE, the AMF may determine whether to include the information indicating whether the network supports the equivalent SNPN or the equivalent SNPN list, and the equivalent SNPN list in the registration accept message or the registration reject message to be transmitted to the UE.

For example, in a case that the registration request message includes information indicating that the UE supports the equivalent SNPN or the equivalent SNPN list, and in a case that the AMF supports the equivalent SNPN list, and the AMF allows the registration request, the AMF may transmit, to the UE, the registration accept message including information indicating that the network supports the equivalent SNPN or the equivalent SNPN list, and including the equivalent SNPN list.

In a case that the registration request message includes information indicating that the UE supports the equivalent SNPN or the equivalent SNPN list, and in a case that the AMF does not support the equivalent SNPN list, and the AMF allows the registration request, the AMF may transmit, to the UE, the registration accept message including information indicating that the network does not support the equivalent SNPN or the equivalent SNPN list, and not including the equivalent SNPN list.

In a case that the registration request message includes information indicating that the UE supports the equivalent SNPN or the equivalent SNPN list, and in a case that the AMF supports the equivalent SNPN list, and the AMF does not allow the registration request, the AMF may transmit, to the UE, the registration reject message including information indicating that the network supports the equivalent SNPN or the equivalent SNPN list, and including the equivalent SNPN list.

In a case that the registration request message includes information indicating that the UE supports the equivalent SNPN or the equivalent SNPN list, and in a case that the AMF does not support the equivalent SNPN list, and the AMF does not allow the registration request, the AMF may transmit, to the UE, the registration reject message including information indicating that the network does not support the equivalent SNPN or the equivalent SNPN list, and not including the equivalent SNPN list.

The UE may recognize whether the network supports the equivalent SNPN or the equivalent SNPN list based on the information indicating whether the network supports the equivalent SNPN or the equivalent SNPN list included in the registration accept message or the registration reject message received from the AMF.

The UE may recognize the equivalent SNPN to the current SNPN based on the equivalent SNPN list included in the registration accept message or the registration reject message received from the AMF.

4. Behavior of UE and/or NW with Respect to NSSAI Inclusion Mode

Next, the behavior of the UE and/or the NW with respect to the NSSAI inclusion mode will be described.

First, in a case that the UE in the 5GMM-IDLE transmits an initial NAS message, a NAS layer of the UE provides the NSSAI (the requested NSSAI or the allowed NSSAI) to a lower layer. In a case that the UE receives the MM message (for example, the registration accept message) including the NSSAI inclusion mode from the AMF, the UE stores the received NSSAI inclusion mode. In a case that the UE does not receive the MM message (for example, the registration accept message) including the NSSAI inclusion mode from the AMF, the UE stores the NSSAI inclusion mode determined by the UE. In a case that the NSSAI inclusion mode is stored, it is stored in association with a current PLMN ID or the SNPN identity (hereinafter also referred to as an SNPN ID) and the access type (3GPP access type or non-3GPP access type). That is, the UE may store the current PLMN ID or the SNPN identity, the access type, and the NSSAI inclusion mode as a set.

The UE may apply, in the current registration area, the NSSAI inclusion mode received in the MM message (for example, the registration accept message) via the current access in the current PLMN and its equivalent PLMN.

The UE may apply, in the current registration area, the NSSAI inclusion mode received in the MM message (for example, the registration accept message) via the current access in the current SNPN and its equivalent SNPN. This may mean that in a case that the UE receives the registration accept message including the NSSAI inclusion mode via the current access (3GPP access or non-3GPP access) in the current SNPN in the current registration area, the UE may also apply the NSSAI inclusion mode to the equivalent SNPN to the current SNPN in the current registration area. In still other words, it may mean that in a case that the UE receives the registration accept message including the NSSAI inclusion mode via the current access (3GPP access or non-3GPP access) in the current SNPN in the current registration area, the UE uses the NSSAI (the requested NSSAI, the allowed NSSAI, or the no NSSAI) specified in the received NSSAI inclusion mode in a case of transmitting the registration request message or the service request message via the same access in the equivalent SNPN to the current SNPN in the current registration area.

In a case that the UE performs the registration procedure for a second PLMN different from the current PLMN (a first PLMN) in the current registration area, the UE does not have the NSSAI inclusion mode for the first PLMN or the second PLMN, and the UE performs the registration procedure via 3GPP access, the UE may provide the no NSSAI to the lower layer. This may be applied to a case where the first PLMN and the second PLMN are in an equivalent PLMN relationship with each other or may be applied to a case where the first PLMN and the second PLMN are not in the equivalent PLMN relationship with each other.

In a case that the UE performs the registration procedure for a second PLMN different from the current PLMN (a first PLMN) in the current registration area, the UE does not have the NSSAI inclusion mode for the first PLMN or the second PLMN, and the UE performs the registration procedure via non-3GPP access, the UE may provide the requested NSSAI to the lower layer. This may be applied to a case where the first PLMN and the second PLMN are in an equivalent PLMN relationship with each other or may be applied to a case where the first PLMN and the second PLMN are not in the equivalent PLMN relationship with each other.

In a case that the UE performs the registration procedure for the current SNPN (the first SNPN), the UE does not have the NSSAI inclusion mode for the first SNPN, and the UE performs the registration procedure via 3GPP access, the UE may provide the no NSSAI to the lower layer.

In a case that the UE performs the registration procedure for the current SNPN (the first SNPN), the UE does not have the NSSAI inclusion mode for the first SNPN, and the UE performs the registration procedure via non-3GPP access, the UE may provide the requested NSSAI to the lower layer.

In a case that the UE performs the registration procedure for a second SNPN different from the current SNPN (the first SNPN) in the current registration area, the UE does not have the NSSAI inclusion mode for the first SNPN or the second SNPN, and the UE performs the registration procedure via 3GPP access, the UE may provide the no NSSAI to the lower layer. This may be applied to a case where the first SNPN and the second SNPN are in an equivalent SNPN relationship with each other or may be applied to a case where the first SNPN and the second SNPN are not in the equivalent SNPN relationship with each other.

In a case that the UE performs the registration procedure for a second SNPN different from the current SNPN (the first SNPN) in the current registration area, the UE does not have the NSSAI inclusion mode for the first SNPN or the second SNPN, and the UE performs the registration procedure via non-3GPP access, the UE may provide the requested NSSAI to the lower layer. This may be applied to a case where the first SNPN and the second SNPN are in an equivalent SNPN relationship with each other or may be applied to a case where the first SNPN and the second SNPN are not in the equivalent SNPN relationship with each other.

In a case that the UE performs the registration procedure via 3GPP access after performing an inter-system change from an S1 mode to the N1 mode and the UE does not have the NSSAI inclusion mode for the PLMN and/or the equivalent PLMN, the UE may not provide the NSSAI to the lower layer.

In a case that the UE performs the registration procedure via non-3GPP access after performing an inter-system change from the S1 mode to the N1 mode and the UE does not have the NSSAI inclusion mode for the PLMN and/or the equivalent PLMN, the UE may provide the NSSAI to the lower layer, or may not provide the NSSAI to the lower layer.

In a case that the UE performs the registration procedure via 3GPP access after performing an inter-system change from the S1 mode to the N1 mode and the UE does not have the NSSAI inclusion mode for the SNPN and/or the equivalent SNPN, the UE may not provide the NSSAI to the lower layer.

In a case that the UE performs the registration procedure via non-3GPP access after performing an inter-system change from the S1 mode to the N1 mode and the UE does not have the NSSAI inclusion mode for the SNPN and/or the equivalent SNPN, the UE may provide the NSSAI to the lower layer, or may not provide the NSSAI to the lower layer.

Here, the S1 mode may mean a mode of the UE capable of accessing a 4G core network via a 4G access network, and S1 mode capability may mean that the UE has a capability of the S1 mode, that is, the UE has a capability of accessing the 4G core network via the 4G access network, or may mean that the UE has a capability of communicating by using the 4G. The N1 mode means a mode of the UE capable of accessing the 5G core network via the 5G access network, and an N1 mode capability may mean that the UE has a capability of the N1 mode, that is, the UE has a capability of accessing the 5G core network via the 5G access network. That is, performing the inter-system change from the S1 mode to the N1 mode may mean changing the system from the 4G system to the 5G system.

In a case that it is required by the operator policy, the AMF may include the NSSAI inclusion mode IE in the registration accept message.

Then, in a case that the UE receives the registration accept message, and in a case that the registration accept message includes the NSSAI inclusion mode IE, in the current registration area, the UE may operate in the NSSAI inclusion mode indicated in the NSSAI inclusion mode IE via the current access in the current SNPN and its equivalent SNPN.

In a case that the UE receives the registration accept message, and in a case that the registration accept message does not include the NSSAI inclusion mode IE and the UE has the current SNPN, its equivalent SNPN, and the NSSAI inclusion mode for the access type, the UE may operate in the stored NSSAI inclusion mode.

In a case that the UE receives the registration accept message, in a case that the registration accept message does not include the NSSAI inclusion mode IE and the UE does not have the current SNPN, its equivalent SNPN, and the NSSAI inclusion mode for the access type, and in a case that the UE is performing the registration procedure via 3GPP access, the UE may operate in the NSSAI inclusion mode D for the current SNPN, its equivalent SNPN, and the current access type.

In a case that the UE receives the registration accept message, In a case that the registration accept message does not include the NSSAI inclusion mode IE and the UE does not have the current SNPN, its equivalent SNPN, and the NSSAI inclusion mode for the access type, and In a case that the UE is performing the registration procedure via non-3GPP access (untrusted non-3GPP access), the UE may operate in the NSSAI inclusion mode B for the current SNPN, its equivalent SNPN, and the current access type.

In a case that the UE receives the registration accept message, in a case that the registration accept message does not include the NSSAI inclusion mode IE and the UE does not have the current SNPN, its equivalent SNPN, and the NSSAI inclusion mode for the access type, and in a case that the UE is performing the registration procedure via non-3GPP access (trusted non-3GPP access), the UE may operate in the NSSAI inclusion mode D for the current SNPN, its equivalent SNPN, and the current access type.

5. Behavior of UE and/or NW with Respect to Method of Managing NSSAI

Next, a method of managing the NSSAI and the behavior of the UE and/or the NW will be described.

First, the NW may provide the UE with the mapped S-NSSAI for a new allowed NSSAI. In a case that the UE receives a new allowed NSSAI for the current SNPN, the UE may delete one or more S-NSSAIs included in the new allowed NSSAI for the current SNPN and/or its equivalent SNPN from the pending NSSAIs stored in the UE. This may be a behavior in a case that the UE is not roaming or may be a behavior in a case that the UE is roaming. In a case that the UE receives the new allowed NSSAI for the current SNPN, the UE may delete one or more mapped S-NSSAIs for the new allowed NSSAI for the current SNPN and/or its equivalent SNPN from the pending NSSAIs stored in the UE. This may be the behavior in the case that the UE is roaming or may be the behavior in the case that the UE is not roaming.

Next, a behavior in a case that the UE receives the S-NSSAI included in the rejected NSSAI included in the MM message will be described.

First, in a case that the UE receives one or more S-NSSAIs included in Rejected NSSAI IE, or in a case that the UE receives one or more S-NSSAIs included in Extended rejected NSSAI IE in the case that the UE is not roaming, the UE may delete one or more S-NSSAIs included in the rejected NSSAI for the current SNPN and/or its equivalent SNPN for any and all access types from the stored pending NSSAIs for the current SNPN and/or its equivalent SNPN.

In a case that the UE receives one or more S-NSSAIs included in Rejected NSSAI IE, or in a case that the UE receives one or more S-NSSAIs included in Extended rejected NSSAI IE in the case that the UE is not roaming, the UE may delete one or more S-NSSAIs included in the rejected NSSAI for the current registration area associated with the same access type from the stored pending NSSAIs for the current SNPN and/or its equivalent SNPN.

In a case that the UE receives one or more S-NSSAIs included in Rejected NSSAI IE, or in a case that the UE receives one or more S-NSSAIs included in Extended rejected NSSAI IE in the case that the UE is not roaming, the UE may delete one or more S-NSSAIs included in the rejected NSSAI for the maximum number of UEs reached for any and all access types from the stored pending NSSAIs for the current SNPN and/or its equivalent SNPN.

In a case that the UE receives one or more S-NSSAIs included in Extended rejected NSSAI IE, the UE may delete one or more S-NSSAIs included in the rejected NSSAI for the current SNPN and/or its equivalent SNPN for any and all access types from the stored pending NSSAIs for the current SNPN and/or its equivalent SNPN.

In a case that the UE receives one or more S-NSSAIs included in Extended rejected NSSAI IE, the UE may delete one or more S-NSSAIs included in the rejected NSSAI for the current registration area associated with the same access type from the stored pending NSSAIs for the current SNPN and/or its equivalent SNPN.

In the case that the UE is not roaming, the UE may delete one or more S-NSSAIs included in the rejected NSSAI for the failed or revoked NSSAA for any and all access types from the stored pending NSSAIs for the current SNPN and/or its equivalent SNPN.

In the case that the UE is not roaming, the UE may delete one or more S-NSSAIs included in one or more mapped S-NSSAIs for the rejected NSSAI for the current SNPN and/or its equivalent SNPN for any and all access types from the stored pending NSSAIs for the current SNPN and/or its equivalent SNPN.

In the case that the UE is not roaming, the UE may delete one or more S-NSSAIs included in one or more mapped S-NSSAIs for the rejected NSSAI for the current registration area associated with the same access type from the stored pending NSSAIs for the current SNPN and/or its equivalent SNPN.

In a case that the pending NSSAI included in the registration accept message is not received and an "NSSAA to be performed" indicator in a 5GS registration result IE included in the registration accept message is not set to "NSSAA is to be performed", the UE may delete the stored pending NSSAI for the current SNPN and/or its equivalent SNPN.

In a case that the registration area includes one or more TAIs belonging to different SNPNs, and the different SNPNs are equivalent SNPNs to each other, for each equivalent SNPN, the UE may replace the stored pending NSSAI with the pending NSSAI received in the registered SNPN.

In a case that the UE de-registers the current SNPN and/or its equivalent SNPN using explicit signaling, and in a case that the UE does not register with the current SNPN and/or its equivalent SNPN via another access, the UE may delete the pending NSSAI for the current SNPN and/or its equivalent SNPN.

In a case that the UE transitions to the 5GMM-DEREGISTERED state for the current SNPN and/or its equivalent SNPN, and in a case that the UE does not register with the current SNPN and/or its equivalent SNPN via another access, the UE may delete the pending NSSAI for the current SNPN and/or its equivalent SNPN.

In a case that the UE is successfully registered to the new SNPN and/or its equivalent SNPN, and in a case that the UE does not register with the current SNPN and/or its equivalent SNPN via another access, the UE may delete the pending NSSAI for the current SNPN and/or its equivalent SNPN.

In a case that the UE fails to register with the new SNPN and/or its equivalent SNPN and transitions to the 5GMM-DEREGISTERED state, and in a case that the UE does not register with the current SNPN and/or its equivalent SNPN via another access, the UE may delete the pending NSSAI for the current SNPN and/or its equivalent SNPN.

In a case that the UE initiates an attach procedure or a tracking area update procedure in the S1 mode and the UE is operating in a single registration mode, and in a case that the UE does not register with the current SNPN and/or its equivalent SNPN via another access, the UE may delete the pending NSSAI for the current SNPN and/or its equivalent SNPN.

6. Modifications

A program running on an apparatus according to the present invention may serve as a program that controls a Central Processing Unit (CPU) and the like to cause a computer to operate in such a manner as to implement the functions of the aforementioned embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for implementing the functions of the embodiments according to the present invention may be recorded on a computer-readable recording medium. The functions may be implemented by causing a computer system to read the program recorded on the recording medium for execution. It is assumed that the "computer system" refers to a computer system built into the apparatuses, and the computer system includes an operating system and hardware components such as a peripheral device. The "computer-readable recording medium" may be a semiconductor recording medium, an optical recording medium, a magnetic recording medium, a medium dynamically retaining the program for a short time, or any other computer-readable recording medium.

Each functional block or various features of the apparatuses used in the aforementioned embodiment may be implemented or performed on an electric circuit, for example, an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor or may be a processor of a known type, a controller, a micro-controller, or a state machine instead. The aforementioned electric circuit may include a digital circuit or may include an analog circuit. In a case that, with advances in semiconductor technology, a circuit integration technology that replaces the present integrated circuits appears, one or multiple aspects of the present invention can also use a new integrated circuit based on the technology.

Note that, the invention of the present application is not limited to the above-described embodiments. In the embodiment, apparatuses have been described as an example, but the invention of the present application is not limited to these apparatuses and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the similar effects are substituted for one another is also included.

CROSS-REFERENCE OF RELATED APPLICATION

This application claims the benefit of priority to Japanese Patent Application No. 2021-128875 filed on Aug. 5, 2021, which is incorporated herein by reference in its entirety.

REFERENCE SIGNS LIST

1 Mobile communication system
10 UE_A
30 PGW-U
32 PGW-C
35 SGW
40 MME
45 eNB
50 HSS
60 PCRF

80 Access network_A (E-UTRAN)
90 Core network_A
120 Access network_B (5G AN)
122 gNB
130 UPF
132 SMF
140 AMF
150 UDM
160 PCF
190 Core network_B

The invention claimed is:

1. A User Equipment (UE) comprising:
transmission and reception circuitry;
storage circuitry; and
controlling circuitry,
wherein;
the UE is configured to support an equivalent Stand-alone Non-Public Network (SNPN),
the transmission and reception circuitry is configured to:
transmit, to an Access and Mobility Management Function (AMF) of a first SNPN, a registration request message including information indicating that the UE supports the equivalent SNPN in a registration procedure, and
receive, from the AMF of the first SNPN, a registration accept message as a response message to the registration request message, wherein:
the registration accept message includes an equivalent SNPN list containing an SNPN identity of a second SNPN, and
the second SNPN is regarded by the UE as equivalent to the first SNPN for SNPN selection,
the controlling circuitry is configured to store the equivalent SNPN list in the storage circuitry, and
in a case that the registration procedure is not for an emergency service, the controlling circuitry is further configured to delete an SNPN identity, that is in a temporarily forbidden SNPNs list, from the equivalent SNPN list stored in the storage circuitry.

2. The UE according to claim 1, wherein the controlling circuitry is further configured to delete the equivalent SNPN list stored in the storage circuitry in a case that the transmission and reception circuitry receives a registration reject message, without integrity protection, including a 5GMM cause value indicating an illegal UE.

3. The UE according to claim 1, wherein the controlling circuitry is further configured to delete the equivalent SNPN list stored in the storage circuitry in a case that a USIM is removed from the UE.

4. An Access and Mobility Management Function (AMF) of a first Stand-alone Non-Public Network (SNPN), the AMF comprising:
transmission and reception circuitry; and
controlling circuitry,
wherein:
the transmission and reception circuitry is configured to receive a registration request message including information indicating that a User Equipment (UE) supports an equivalent SNPN in a registration procedure,
the controlling circuitry is configured to include an equivalent SNPN list in a registration accept message as a response message to the registration request message, wherein:
the equivalent SNPN list contains an SNPN identity of a second SNPN, and
the second SNPN is regarded as equivalent to the first SNPN for SNPN selection, and
the transmission and reception circuitry is further configured to transmit the registration accept message to the UE, the registration accept message causing the UE to delete an SNPN identity, that is in a temporarily forbidden SNPNs list, from the equivalent SNPN list stored in the UE in a case that the registration procedure is not for an emergency service.

5. The AMF according to claim 4, wherein the transmission and reception circuitry is further configured to transmit, to the UE, a registration reject message, without integrity protection, including a 5GMM cause value indicating an illegal UE, the registration reject message causing the UE to delete the equivalent SNPN list stored in the UE.

6. A communication control method performed by a User Equipment (UE) supporting an equivalent Stand-alone Non-Public Network (SNPN), the communication control method comprising:
transmitting, to an Access and Mobility Management Function (AMF) of a first SNPN, a registration request message including information indicating that the UE supports the equivalent SNPN in a registration procedure;
receiving, from the AMF of the first SNPN, a registration accept message as a response message to the registration request message, wherein:
the registration accept message includes an equivalent SNPN list containing an SNPN identity of a second SNPN, and
the second SNPN is regarded by the UE as equivalent to the first SNPN for SNPN selection;
storing the equivalent SNPN list in the UE; and
in a case that the registration procedure is not for an emergency service, deleting an SNPN identity, that is in a temporarily forbidden SNPNs list, from the equivalent SNPN list stored in the UE.

* * * * *